(12) United States Patent
Pulikkoonattu

(10) Patent No.: US 12,609,785 B2
(45) Date of Patent: Apr. 21, 2026

(54) SYSTEMS AND METHODS FOR PROBABILISTIC QUADRATURE AMPLITUDE MODULATION (QAM)

(71) Applicant: Avago Technologies International Sales Pte. Limited, Singapore (SG)

(72) Inventor: Rethnakaran Pulikkoonattu, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 39 days.

(21) Appl. No.: 18/649,242

(22) Filed: Apr. 29, 2024

(65) Prior Publication Data

US 2025/0202622 A1 Jun. 19, 2025

Related U.S. Application Data

(60) Provisional application No. 63/610,530, filed on Dec. 15, 2023.

(51) Int. Cl.
*H04L 1/00* (2006.01)
(52) U.S. Cl.
CPC .......... *H04L 1/0058* (2013.01); *H04L 1/0041* (2013.01); *H04L 1/0068* (2013.01)
(58) Field of Classification Search
CPC ... H04L 1/0041; H04L 1/0042; H04L 1/0058; H04L 1/0061; H04L 1/0064; H04L 1/0068; H04L 1/0069; H03M 13/1151; H03M 13/1162; H03M 13/6362
See application file for complete search history.

(56) References Cited

U.S. PATENT DOCUMENTS

| | | | |
|---|---|---|---|
| 7,401,283 B2 | 7/2008 | Shen et al. | |
| 7,555,694 B2 | 6/2009 | Kyung et al. | |
| 9,484,957 B2 | 11/2016 | Jeong et al. | |
| 10,091,046 B1 | 10/2018 | Lefevre | |
| 10,476,728 B2 | 11/2019 | Zhang et al. | |
| 10,944,504 B2 | 3/2021 | Lefevre | |

(Continued)

FOREIGN PATENT DOCUMENTS

EP 2 688 210 B1 1/2014

OTHER PUBLICATIONS

Bocherer, "On Joint Design of Probabilistic Shaping and Forward Error Correction for Optical Systems", Optical Society of America, pp. 1-36, dated 2018.

(Continued)

*Primary Examiner* — Shelly A Chase
(74) *Attorney, Agent, or Firm* — Foley & Lardner LLP

(57) ABSTRACT

An apparatus may include a transmitter and one or more processors. The one or more processors may identify, by a low-density parity-check (LDPC) encoder, a target code rate for which to encode data. The one or more processors may receive, by the LDPC encoder, a first set of information bits. The one or more processors may receive, by the LDPC encoder from an output of a shaping encoder, a second set of information bits. The one or more processors may adjust a code rate of an LDPC code to a second code rate higher than the target code rate to cause the LDPC encoder to encode the data at the target code rate. The one or more processors may encode the data using the LDPC code. The transmitter may transmit the encoded data.

20 Claims, 20 Drawing Sheets

1100

Identifying, by a low-density parity-check (LDPC) encoder of a first device, a target code rate for which to encode data 1102

Receiving, by the LDPC encoder of the first device, a first set of information bits 1104

Receiving, by the LDPC encoder of the first device from an output of a shaping encoder, a second set of information bits 1106

Adjusting, by the LDPC encoder of the first device based on the second set of information bits, a code rate of an LDPC code to a second code rate higher than the target code rate to cause the LDPC encoder to encode the data at the target code rate 1108

Encoding, by one or more processors of the first device, the data using the LDPC code 1110

Transmitting, by the one or more processors of the first device, the encoded data 1112

(56)     References Cited

U.S. PATENT DOCUMENTS

| 10,972,215 | B2 | 4/2021 | Cho et al. |
| 11,316,535 | B2 | 4/2022 | Jeong et al. |
| 2021/0084654 | A1 | 3/2021 | Yang et al. |
| 2021/0211229 | A1* | 7/2021 | Doan ................. H04L 27/3405 |
| 2023/0033774 | A1* | 2/2023 | Koike-Akino ......... H04L 27/36 |
| 2023/0412193 | A1 | 12/2023 | Ikegaya et al. |

OTHER PUBLICATIONS

Meng et al. "A probablistic amplitude shaping scheme on amplitude and phase shift keying modulation", SPIE, vol. 12748, pp. 1-10, dated 2023.

Partial European Search Report on Appln. No. 24212701.7 dated Apr. 15, 2025.

* cited by examiner

100
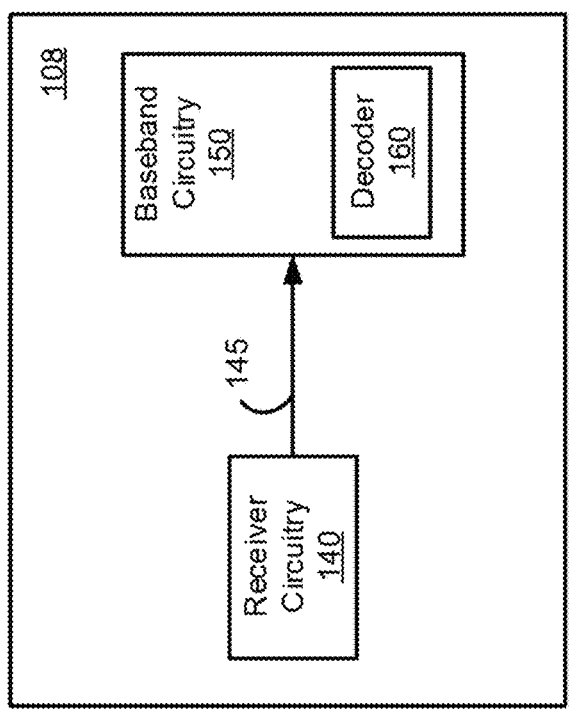
125
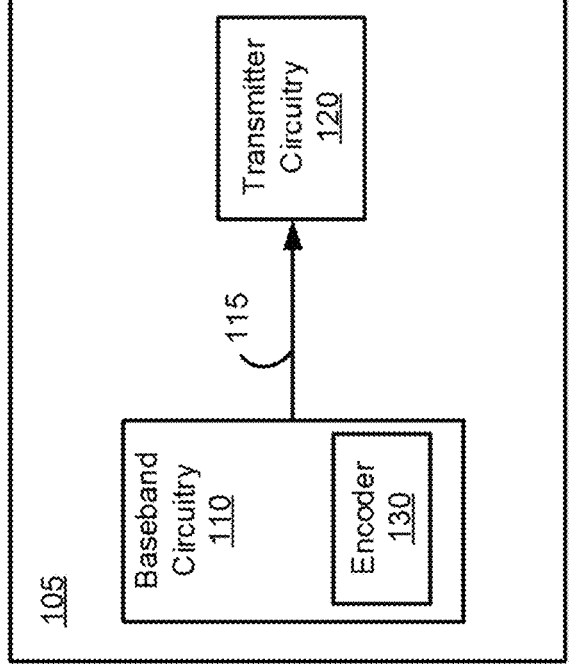
FIG. 1

300

450

400

550

551

500

| Idx 701 | Shaper In 702 | Shaper Out 703 | Length 704 | Probability 705 |
|---|---|---|---|---|
| 1 | [0, 0, 0, 0] | [0, 1, 1, 1] | 4 | 0.0625 |
| 2 | [0, 0, 0, 1] | [0, 1, 1, 0] | 4 | 0.0625 |
| 3 | [0, 0, 1, 0] | [0, 1, 0, 0] | 4 | 0.0625 |
| 4 | [0, 0, 1, 1] | [0, 1, 0, 1] | 4 | 0.0625 |
| 5 | [0, 1, 0, 0] | [0, 1, 0, 0] | 4 | 0.0625 |
| 6 | [0, 1, 0, 1] | [0, 1, 0, 0] | 4 | 0.0625 |
| 7 | [0, 1, 1, 0] | [0, 1, 0, 1] | 4 | 0.0625 |
| 8 | [0, 1, 1, 1] | [0, 1, 0, 1] | 4 | 0.0625 |
| 9 | [1, 0, 0, 0, 0] | [0, 0, 0, 1] | 5 | 0.03125 |
| 10 | [1, 0, 0, 0, 1] | [0, 0, 0, 0] | 5 | 0.03125 |
| 11 | [1, 0, 0, 1, 0] | [0, 0, 0, 0] | 5 | 0.03125 |
| 12 | [1, 0, 0, 1, 1] | [0, 0, 0, 1] | 5 | 0.03125 |
| 13 | [1, 0, 1, 0, 0] | [0, 0, 1, 0] | 5 | 0.03125 |
| 14 | [1, 0, 1, 0, 1] | [0, 0, 0, 0] | 5 | 0.03125 |
| 15 | [1, 0, 1, 1, 0] | [0, 0, 1, 1] | 5 | 0.03125 |
| 16 | [1, 0, 1, 1, 1] | [0, 0, 1, 1] | 5 | 0.03125 |
| 17 | [1, 1, 0, 0, 0] | [1, 0, 0, 0] | 5 | 0.03125 |
| 18 | [1, 1, 0, 0, 1] | [1, 0, 0, 0] | 5 | 0.03125 |
| 19 | [1, 1, 0, 1, 0, 0] | [1, 0, 0, 1] | 6 | 0.015625 |
| 20 | [1, 1, 0, 1, 0, 1] | [1, 0, 0, 1] | 6 | 0.015625 |
| 21 | [1, 1, 0, 1, 1, 0] | [1, 0, 0, 0] | 6 | 0.015625 |
| 22 | [1, 1, 0, 1, 1, 1] | [1, 0, 0, 0] | 6 | 0.015625 |
| 23 | [1, 1, 1, 0, 0, 0] | [1, 0, 0, 1] | 6 | 0.015625 |
| 24 | [1, 1, 1, 0, 0, 1] | [1, 0, 0, 1] | 6 | 0.015625 |
| 25 | [1, 1, 1, 0, 1, 0] | [1, 1, 0, 0] | 6 | 0.015625 |
| 26 | [1, 1, 1, 0, 1, 1] | [1, 1, 0, 1] | 6 | 0.015625 |
| 27 | [1, 1, 1, 1, 0, 0] | [1, 1, 0, 0] | 6 | 0.015625 |
| 28 | [1, 1, 1, 1, 0, 1] | [1, 1, 0, 0] | 6 | 0.015625 |
| 29 | [1, 1, 1, 1, 1, 0] | [1, 1, 0, 1] | 6 | 0.015625 |
| 30 | [1, 1, 1, 1, 1, 0, 0] | [1, 1, 1, 0, 0] | 7 | 0.0078125 |
| 31 | [1, 1, 1, 1, 1, 1, 1, 0] | [1, 1, 1, 1, 0] | 8 | 0.00390625 |
| 32 | [1, 1, 1, 1, 1, 1, 1, 1] | [1, 1, 1, 1, 1] | 8 | 0.00390625 |

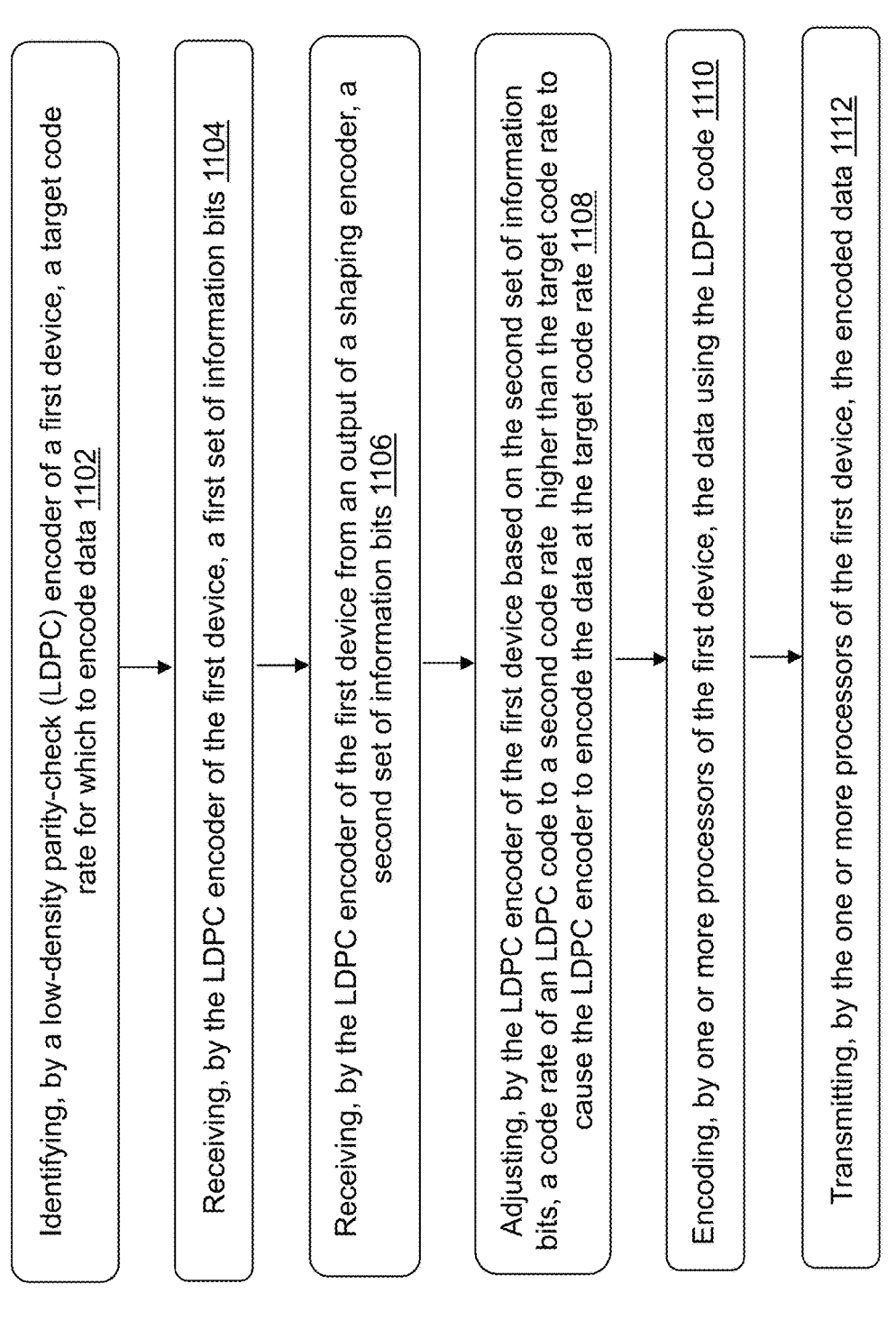

1100

Identifying, by a low-density parity-check (LDPC) encoder of a first device, a target code rate for which to encode data 1102

Receiving, by the LDPC encoder of the first device, a first set of information bits 1104

Receiving, by the LDPC encoder of the first device from an output of a shaping encoder, a second set of information bits 1106

Adjusting, by the LDPC encoder of the first device based on the second set of information bits, a code rate of an LDPC code to a second code rate higher than the target code rate to cause the LDPC encoder to encode the data at the target code rate 1108

Encoding, by one or more processors of the first device, the data using the LDPC code 1110

Transmitting, by the one or more processors of the first device, the encoded data 1112

FIG. 11

SYSTEMS AND METHODS FOR PROBABILISTIC QUADRATURE AMPLITUDE MODULATION (QAM)

CROSS-REFERENCE TO RELATED APPLICATIONS

This application claims the benefit of priority to each of U.S. Provisional Patent Application No. 63/610,530 filed on Dec. 15, 2023, which is incorporated herein by reference in its entirety for all purposes.

FIELD OF THE DISCLOSURE

This disclosure generally relates to systems and methods for improving encoding process of a communications system and/or performing probabilistically coded modulations to improve performance of quadrature amplitude modulation (QAM) by constellation shaping of the signals/codes.

BACKGROUND

Error correcting codes enable information data to be exchanged between a transmitter communication system and a receiver communication system in a reliable manner. A transmitter communication system encodes the information data to obtain a codeword. The codeword is encoded information data. The transmitter communication system transmits the codeword to the receiver communication system. Due to noise in the communication channel, the transmission received by the receiver communication system may not be identical to the transmitted codeword. Encoding information data allows a receiver communication system with a proper decoding process to recover the information data from the received transmission despite such noise. For example, the transmitter communication system transmits parity bits to the receiver communication system. The parity bits allow the receiver communication system to verify whether the received transmission is a valid codeword and to correct errors in the transmission if the received transmission is not a valid codeword. In one approach, generating parity bits involves a complex process.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1 is a diagram depicting an example communication environment with communication systems, according to one or more embodiments.

FIG. 7A and FIG. 7B are diagrams depicting an example shaping code, according to one or more embodiments.

FIG. 11 is a flow diagram showing a process for encoding data and/or decoding data using a shaping code and an LDPC code, in accordance with an embodiment.

Figure 2:
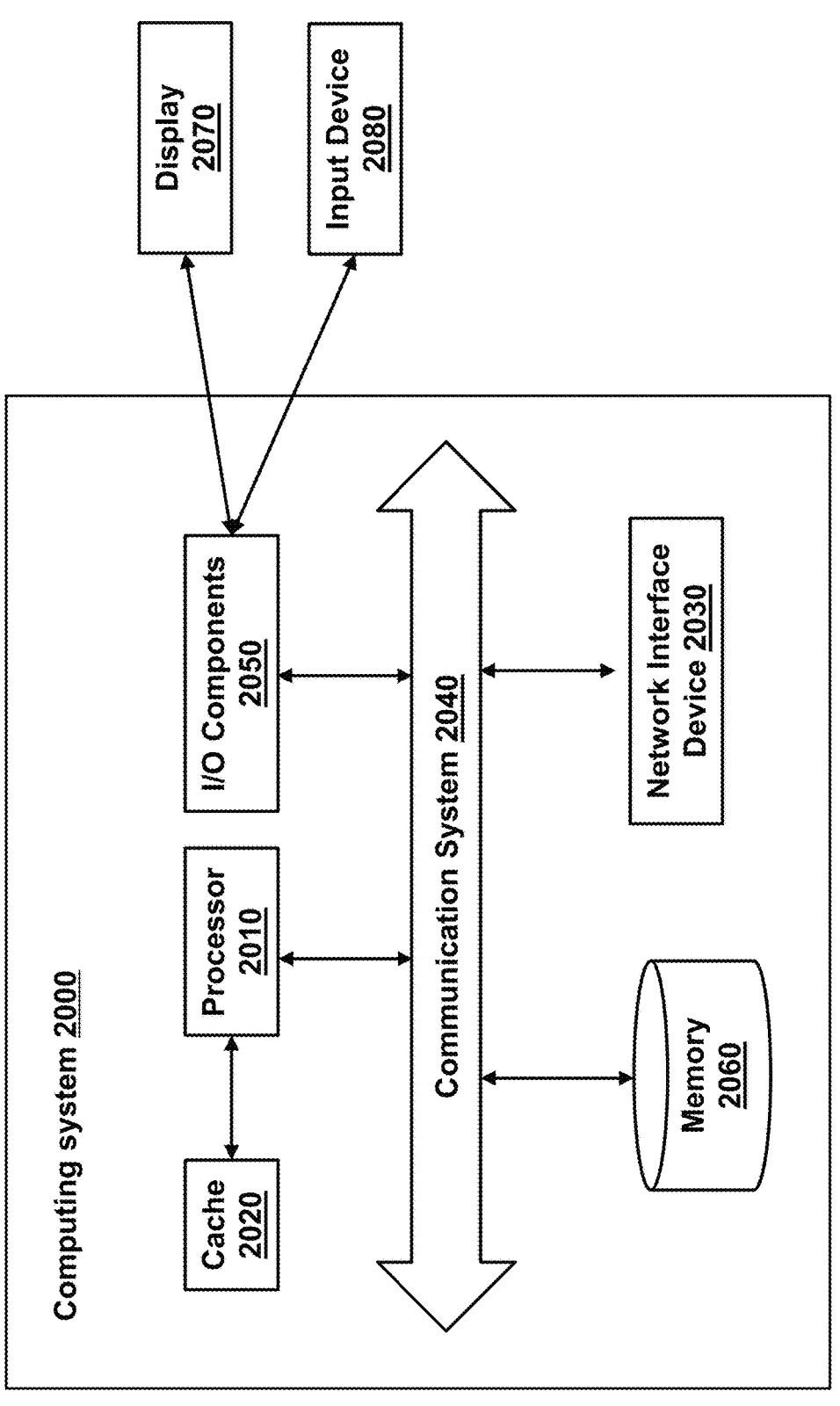
FIG. 2 is a schematic block diagram of a computing system, according to an embodiment.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, illustrated is a diagram depicting an example communication environment 100 including communication systems (or communication apparatuses) 105, 108, according to one or more embodiments. In one embodiment, the communication system 105 includes a baseband circuitry 110 and a transmitter circuitry 120, and the communication system 108 includes a baseband circuitry 150 and a receiver circuitry 140. In one aspect, the communication system 105 is considered a transmitter communication system, and the communication system 108 is considered a receiver communication system. These components operate together to exchange data (e.g., messages or frames) through a wireless medium. These components are embodied as application specific integrated circuit (ASIC), field programmable gate array (FPGA), or any combination of these, in one or more embodiments. In some embodiments, the communication systems 105, 108 include more, fewer, or different components than shown in FIG. 1. For example, each of the communication systems 105, 108 includes transceiver circuitry to allow bi-directional communication between the communication systems 105, 108 or with other communication systems. In some embodiments, each of the communication systems 105, 108 may have configuration similar to that of a computing system 2000 as shown in FIG. 2.

The baseband circuitry 110 of the communication system 105 is a circuitry that generates the baseband data 115 for transmission. The baseband data 115 includes information data (e.g., signal(s)) at a baseband frequency for transmission. In one approach, the baseband circuitry 110 includes an encoder 130 that encodes the data, and generates or outputs parity bits. In one aspect, the baseband circuitry 110 (or encoder 130) obtains a generator matrix or a parity check matrix, or uses a previously produced generator matrix or a previously produced parity check matrix, and encodes the information data by applying the information data to the generator matrix or the parity check matrix to obtain a codeword. In some embodiments, the baseband circuitry 110 stores one or more generator matrices or one or more parity check matrices that conform to any IEEE 802.11 standard for WLAN communication. The baseband circuitry 110 retrieves the stored generator matrix or the stored parity check matrix in response to detecting information data to be transmitted, or in response to receiving an instruction to encode the information data. In one approach, the baseband circuitry 110 generates the parity bits according to a portion of the generator matrix or using the parity check matrix, and appends the parity bits to the information bits to form a codeword. The baseband circuitry 110 generates the baseband data 115 including the codeword for the communication system 108, and provides the baseband data 115 to the transmitter circuitry 120.

The transmitter circuitry 120 of the communication system 105 includes or corresponds to a circuitry that receives the baseband data 115 from the baseband circuitry 110 and transmits a wireless signal 125 according to the baseband data 115. In one configuration, the transmitter circuitry 120 is coupled between the baseband circuitry 110 and an antenna (not shown). In this configuration, the transmitter circuitry 120 up-converts the baseband data 115 from the baseband circuitry 110 onto a carrier signal to generate the wireless signal 125 at an RF frequency (e.g., 10 MHz to 60 GHz), and transmits the wireless signal 125 through the antenna.

The receiver circuitry 140 of the communication system 108 is a circuitry that receives the wireless signal 125 from the communication system 105 and obtains baseband data 145 from the received wireless signal 125. In one configuration, the receiver circuitry 140 is coupled between the baseband circuitry 150 and an antenna (not shown). In this configuration, the receiver circuitry 140 receives the wireless signal 125 though an antenna, and down-converts the wireless signal 125 at an RF frequency according to a carrier signal to obtain the baseband data 145 from the wireless signal 125. The receiver circuitry 140 then provides the baseband data 145 to the baseband circuitry 150.

The baseband circuitry 150 of the communication system 108 includes or corresponds to a circuitry that receives the baseband data 145 from the receiver circuitry 140 and obtains information data from the received baseband data 145. In one embodiment, the baseband circuitry 150 includes a decoder 160 that extracts information and parity bits from the baseband data 145. The decoder 160 decodes the baseband data 145 to obtain the information data generated by the baseband circuitry 110 of the communication system 105.

In some embodiments, each of the baseband circuitry 110 (including the encoder 130), the transmitter circuitry 120, the receiver circuitry 140, and the baseband circuitry 150 (including the decoder 160) may be as one or more processors, application specific integrated circuit (ASIC), field programmable gate array (FPGA), or any combination of them.

FIG. 2 is a schematic block diagram of a computing system, according to an embodiment. An illustrated example computing system 2000 includes one or more processors 2010 in direct or indirect communication, via a communication system 2040 (e.g., bus), with memory 2060, at least one network interface controller 2030 with network interface port for connection to a network (not shown), and other components, e.g., input/output ("I/O") components 2050. Generally, the processor(s) 2010 will execute instructions (or computer programs) received from memory. The processor(s) 2010 illustrated incorporate, or are connected to, cache memory 2020. In some instances, instructions are read from memory 2060 into cache memory 2020 and executed by the processor(s) 2010 from cache memory 2020. The computing system 2000 may not necessarily contain all of these components shown in FIG. 2, and may contain other components that are not shown in FIG. 2.

In more detail, the processor(s) 2010 may be any logic circuitry that processes instructions, e.g., instructions fetched from the memory 2060 or cache 2020. In many implementations, the processor(s) 2010 are microprocessor units or special purpose processors. The computing device 2050 may be based on any processor, or set of processors, capable of operating as described herein. The processor(s) 2010 may be single core or multi-core processor(s). The processor(s) 2010 may be multiple distinct processors.

The memory 2060 may be any device suitable for storing computer readable data. The memory 2060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 2000 may have any number of memory devices 2060.

The cache memory 2020 is generally a form of computer memory placed in close proximity to the processor(s) 2010 for fast read times. In some implementations, the cache memory 2020 is part of, or on the same chip as, the processor(s) 2010. In some implementations, there are multiple levels of cache 2020, e.g., L2 and L3 cache layers.

The network interface controller 2030 manages data exchanges via the network interface (sometimes referred to as network interface ports). The network interface controller 2030 handles the physical and data link layers of the OSI model for network communication. In some implementations, some of the network interface controller's tasks are handled by one or more of the processor(s) 2010. In some implementations, the network interface controller 2030 is part of a processor 2010. In some implementations, the computing system 2000 has multiple network interfaces controlled by a single controller 2030. In some implementations, the computing system 2000 has multiple network interface controllers 2030. In some implementations, each network interface is a connection point for a physical network link (e.g., a cat-5 Ethernet link). In some implementations, the network interface controller 2030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 2030 implements one or more network protocols such as Ethernet. Generally, a computing device 2050 exchanges data with other computing devices via physical or wireless links through a network interface. The network interface may link directly to another device or to another device via an intermediary device, e.g., a network device such as a hub, a bridge, a switch, or a router, connecting the computing device 2000 to a data network such as the Internet.

The computing system 2000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 2000 may include an interface (e.g., a universal serial bus (USB) interface) for connecting input devices, output devices, or additional memory devices (e.g., portable flash drive or external media drive). In some implementations, a computing device 2000 includes an additional device such as a co-processor, e.g., a math co-processor can assist the processor 2010 with high precision or complex calculations.

The components 2090 may be configured to connect with external media, a display 2070, an input device 2080 or any other components in the computing system 2000, or combinations thereof. The display 2070 may be a liquid crystal display (LCD), an organic light emitting diode (OLED) display, a flat panel display, a solid state display, a cathode ray tube (CRT) display, a projector, a printer or other now known or later developed display device for outputting determined information. The display 2070 may act as an interface for the user to see the functioning of the processor(s) 2010, or specifically as an interface with the software stored in the memory 2060.

The input device 2080 may be configured to allow a user to interact with any of the components of the computing system 2000. The input device 2080 may be a plurality pad, a keyboard, a cursor control device, such as a mouse, or a joystick. Also, the input device 2080 may be a remote control, touchscreen display (which may be a combination of the display 2070 and the input device 2080), or any other device operative to interact with the computing system 2000, such as any device operative to act as an interface between a user and the computing system 2000.

In one aspect, a parity check matrix defines a set of equations that are satisfied by any valid codeword. The parity check matrix may be used for encoding low density parity check ("LDPC") codes, described by Richardson and Urbanke in IEEE Transactions on Information Theory, Vol. 47, No. 2 (February 2001). Generally, many wireless and wireline communication systems use LDPC as a forward error correction coding scheme.

In one aspect, constellation shaping is an energy efficiency enhancement method used in digital signal modulation. Constellation shaping can improve upon traditional modulation techniques like amplitude and phase-shift keying (APSK) and quadrature amplitude modulation (QAM) by modifying the continuous uniform distribution of data symbols to match the channel characteristics.

Figure 3A:
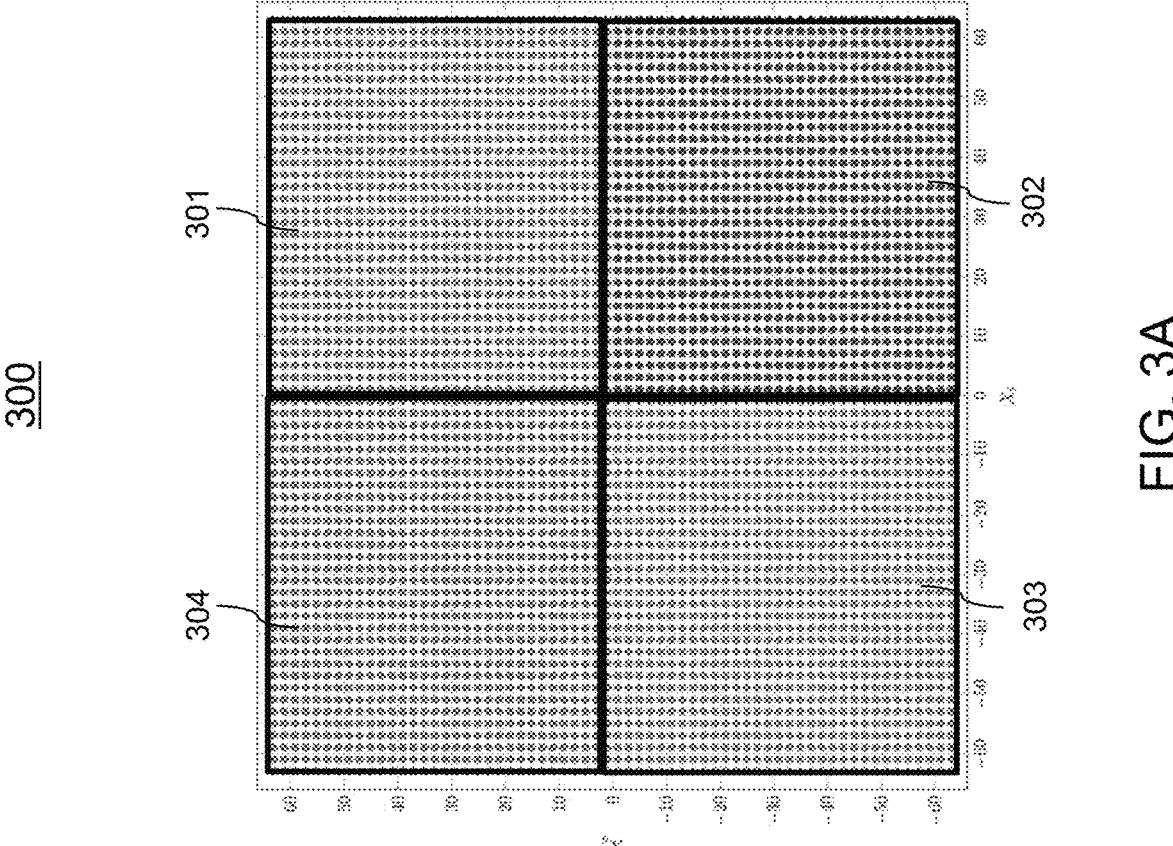
FIG. 3A, FIG. 3B and FIG. 3C are diagrams depicting an LDPC-coded modulation system using uniformly distributed QAM constellations, and information theoretic limits to uniformly distributed QAM constellations.
Figure 3B:
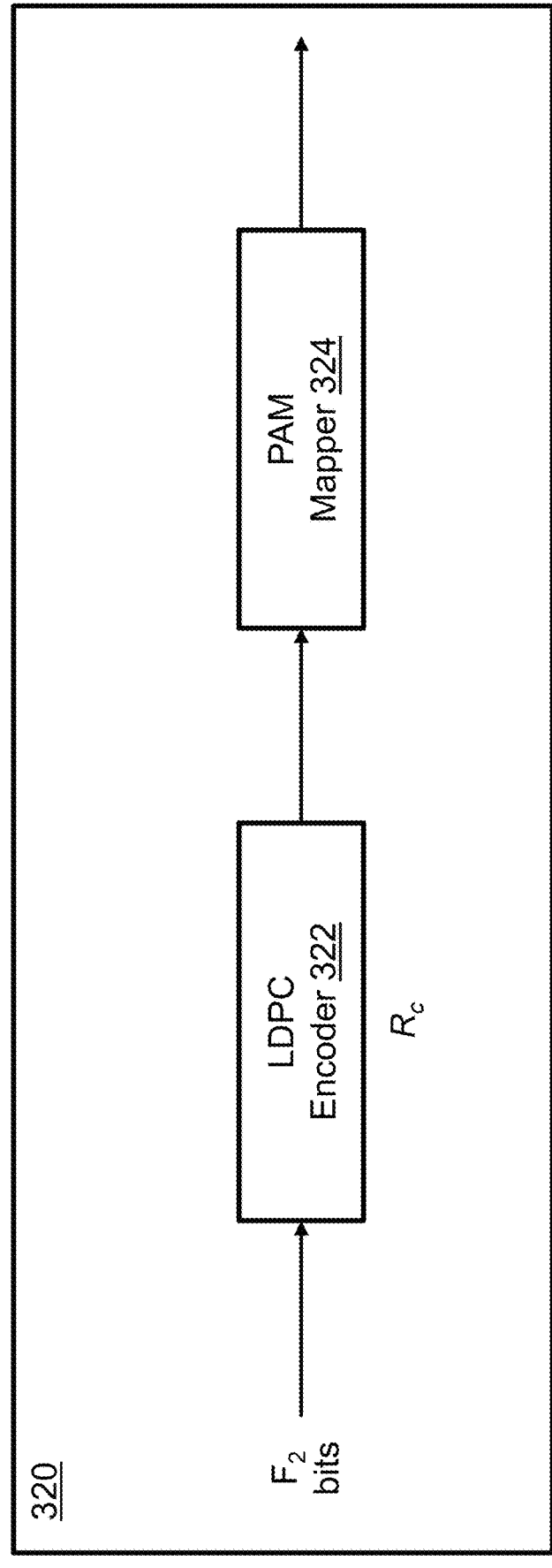
Figure 3C:
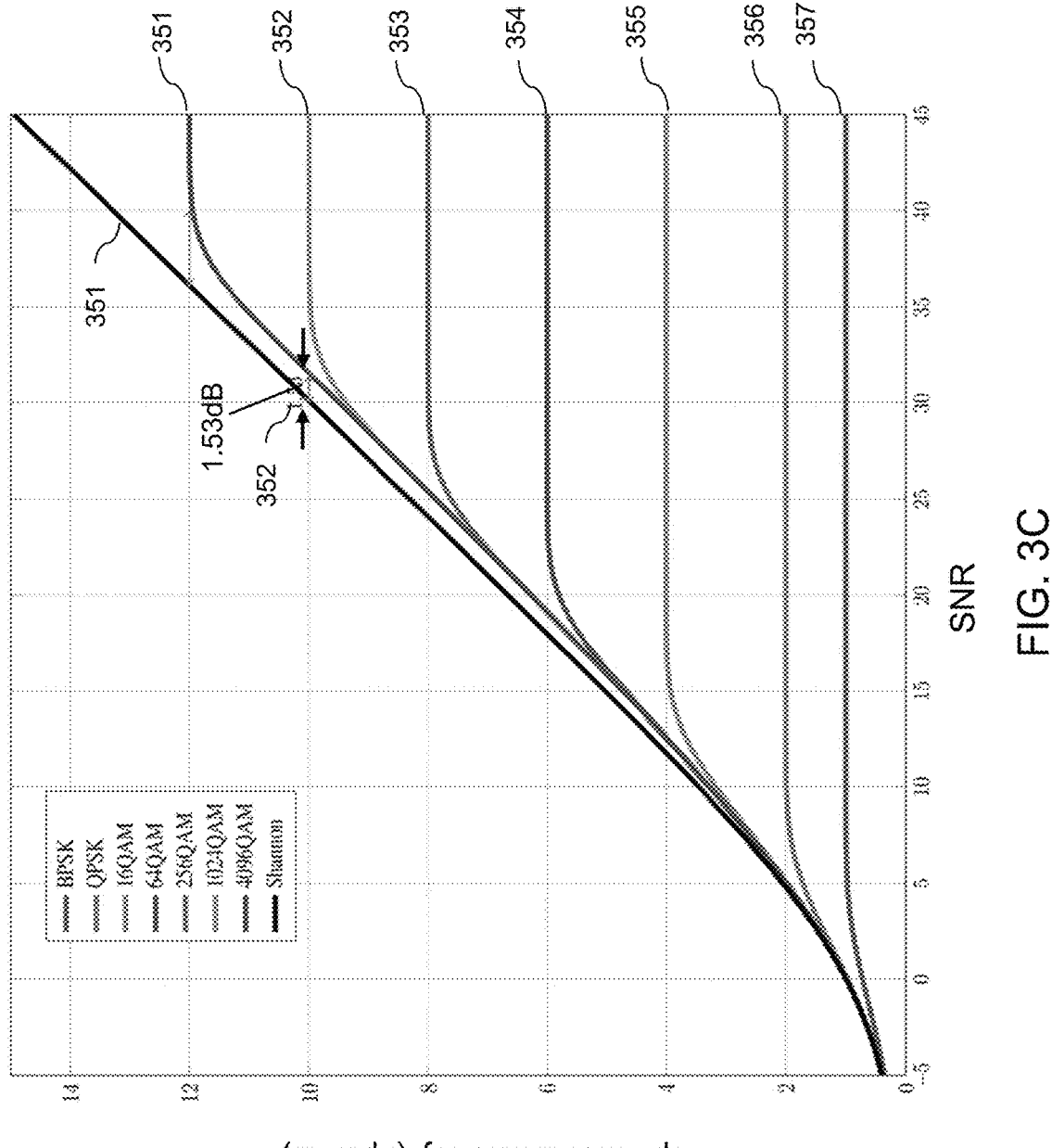

FIG. 3A, FIG. 3B and FIG. 3C are diagrams depicting an LDPC-coded modulation system using uniformly distributed QAM constellations, and information theoretic limits to uniformly distributed QAM constellations. FIG. 3A shows a constellation structure 300 of 1024 QAM (with constellation size M=1024) in which there exist 4 different partitions (e.g., divisions or subdivisions) 301, 302, 303, 304 depending on real dimensions and imaginary dimensions so that a decoder can utilize this simple partition scheme. FIG. 3B shows a block diagram of an LDPC coded modulation system 320 including an LDPC encoder 322 and a pulse amplitude modulation (PAM) symbol mapper (or "PAM mapper") 324. The LDPC encoder 322 can receive a plurality of binary values (e.g., values in the $F_2$ field) from a source and generate a codeword of length N at its output. The PAM mapper 324 can map every $\log_2$ M value (from an M-ary signal constellation (e.g., 1024 QAM)) into analog waveforms for transmission. The LDPC coded modulation system 320 may be an LDPC-BICM system in combination with a conventional QAM (with uniformly distributed QAM constellations). The BICM refers to a binary interleaved coded modulation system, which is a model of a coded modulation system which most communication systems are based on. The system 320 may leave a gap in terms of achievable limits as shown in FIG. 3C. FIG. 3C shows spectral efficiency of various modulations schemes including Binary Phase-shift keying (BPSK), Quadrature Phase-shift keying (QPSK), 16-QAM, 64-QAM, 256-QAM, 1024-QAM and 4096-QAM, which are indicated by lines 357, 356, 355, 354, 353, 352 and 351, respectively. FIG. 3C also shows a limit to the spectral efficiency of a channel (Shannon limit) which is indicated by line 351, and a gap 352 of 1.53 dB between the Shannon limit and a QAM (e.g., 4096-QAM).

Shannon limit (or Shannon capacity) refers to a maximum rate of error-free data that can theoretically be transferred over the channel if the link is subject to random data transmission errors, for a particular noise level. The Shannon limit is a fundamental limit of a channel, which is achieved when the distribution of a code matches to an optimum distribution for a given channel. The Shannon limit is achieved when the mutual information is maximized and that happens when the input distribution matches to the optimum distribution. For example, for a white Gaussian noise (AWGN) channel, the mutual information is maximized when the codebook also has gaussian distribution and that maximum mutual information is the Shannon limit. The Shannon limit may not change with the distribution, but is a fixed number for a given channel (while the actual rate may depend on the distribution).

A maximum achievable transmission rate can be improved by matching probability to the input distribution, increasing the block length (to have a large block length), and/or using Gaussian random codes. The achievable capacity can be also limited by a finite length performance. For example, the Polyanskiy bound can provide a bound on the required energy per bit in communication systems, which is the baseline of the finite length performance. Capacity of a BICM can depend on a uniform codebook, a large block length, and/or a random code. Communication systems that use the uniformly distributed QAM constellations may cause a loss of up to πe/6 (≈153 dB) toward the Shannon limit. If a communication system uses a codebook constructed with uniform distribution (and do not induce distribution to the codebook), there exists 1.53 dB gap for a particular channel. In order to reduce this gap, a communication system can perform constellation shaping to benefit from moving away from uniform QAM. For example, there are broadly two approaches to constellation shaping: geometric constellation shaping (see FIG. 4A and FIG. 4B) and probabilistic constellation shaping (see FIG. 5A and FIG. 5B).

Figures 4A, 4B:
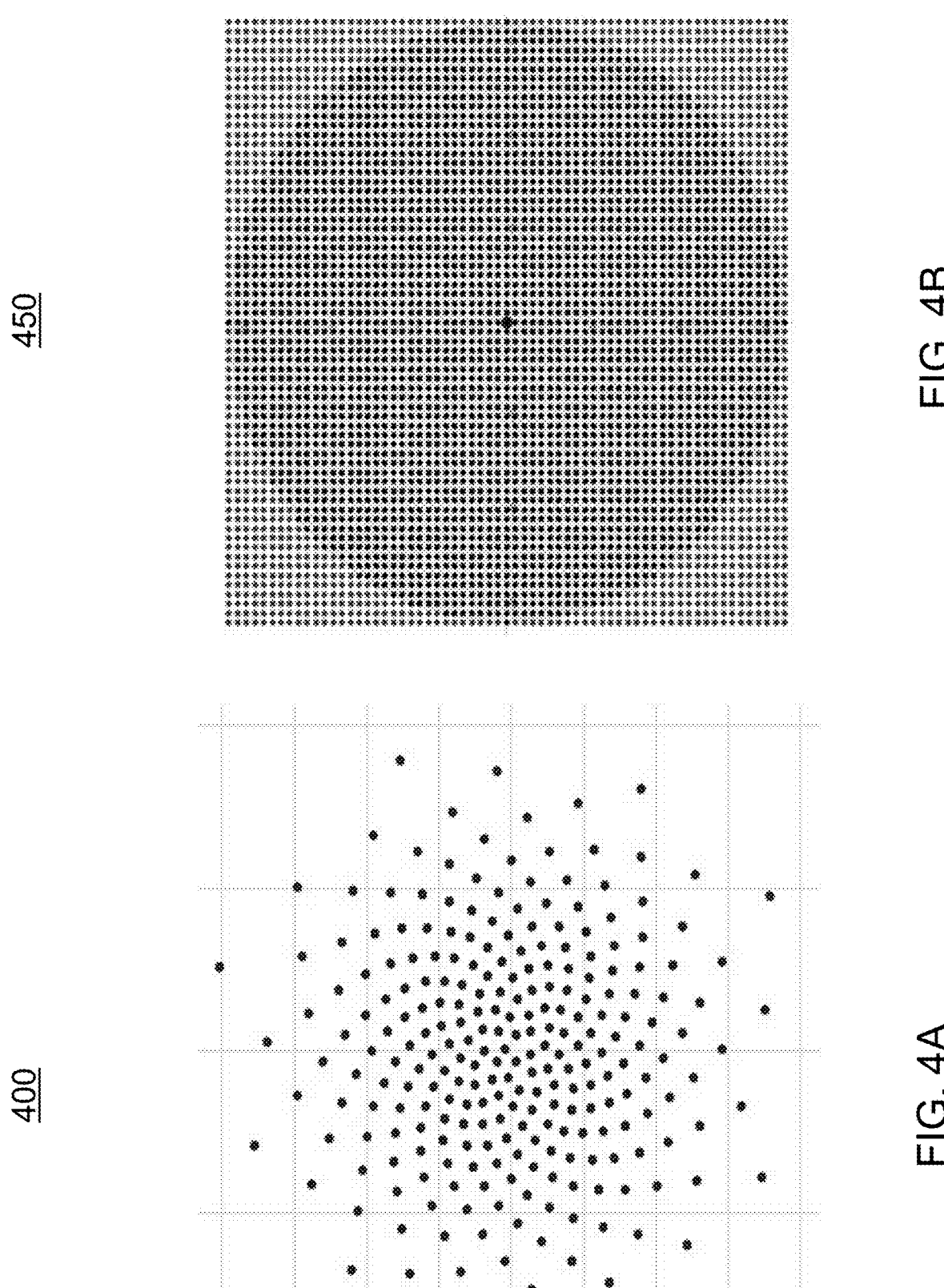
FIG. 4A and FIG. 4B are diagrams depicting geometric constellation shaping, according to one or more embodiments.

FIG. 4A and FIG. 4B are diagrams 400, 450 depicting geometric constellation shaping, according to one or more embodiments. Geometric constellation shaping aims to shape the constellation lattice close to Gaussian geometry so that the constellation can have Gaussian distribution with large M. For example, points can be placed at unequal distances (e.g., by changing distance between points), but with uniform probability. Although it is not trivial to track when radio frequency (RF) impairments is significant, geometric constellation shaping is deployed in some wired systems and/or standards.

Figure 5B:
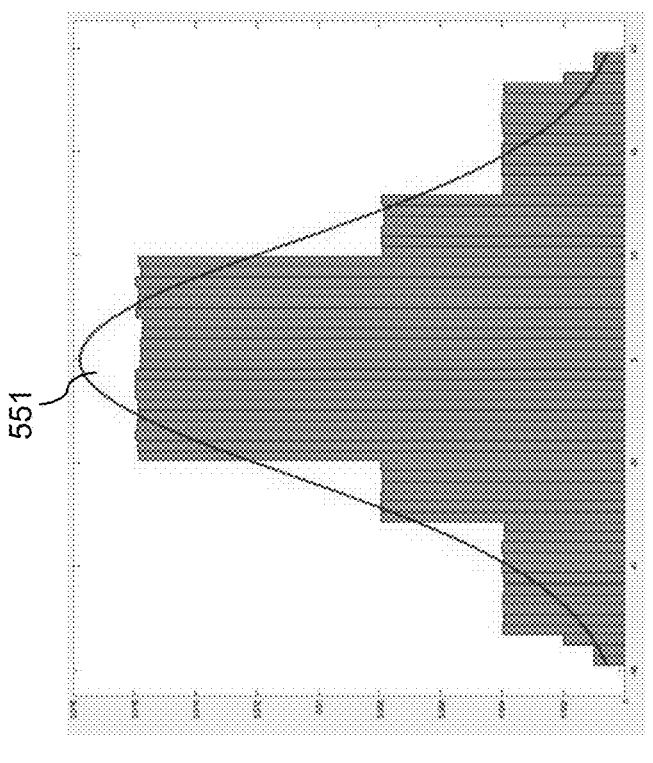
FIG. 5A and FIG. 5B are diagrams depicting probabilistic constellation shaping, according to one or more embodiments.
Figure 5A:
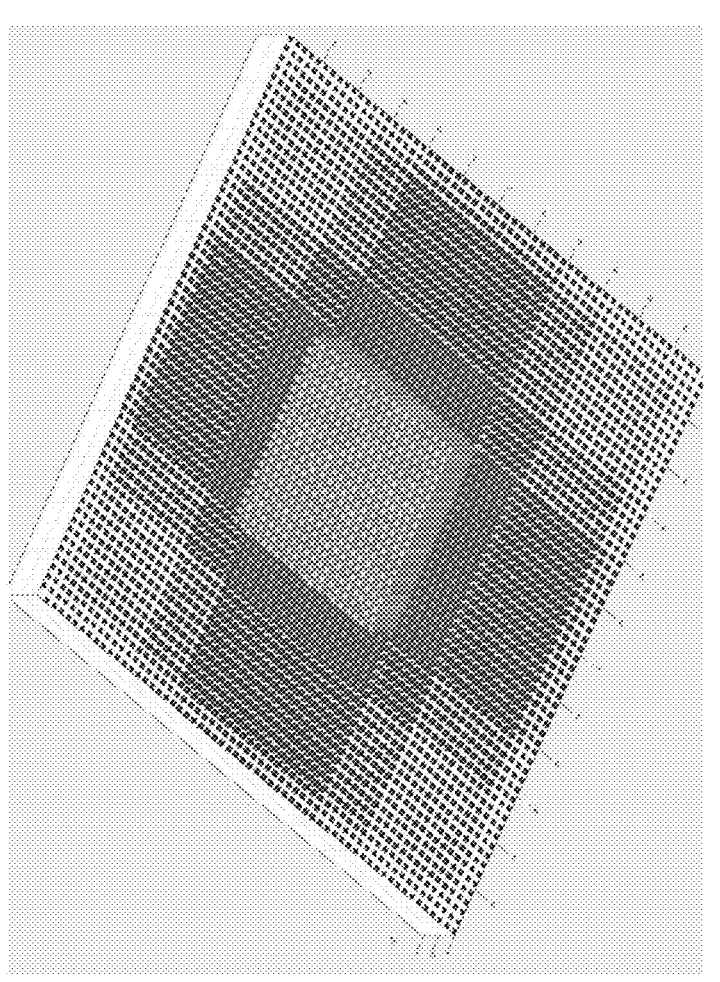

FIG. 5A and FIG. 5B are diagrams depicting probabilistic constellation shaping, according to one or more embodiments. FIG. 5A shows a diagram 500 depicting grids of a constellation being weighted with different probabilities. FIG. 5B shows a diagram 550 depicting a probability distribution over the grids, in which the curve 551 indicates an ideal mapping (e.g., Gaussian mapping). FIG. 5B also shows that a grid with a large length (e.g., grids at or near ±60) maps to a small probability.

In one aspect, a communication system (e.g., LDPC-coded modulation/demodulation system) can include a shaping encoder configured to apply a constellation shaping scheme (e.g., probabilistic constellation shaping) to QAM. For example, if the shaping encoder produces a length-$n_s$ amplitude block from a length-$(k_s$-$n_s)$ input bit block, with $k_s$>$n_s$, a shaping rate (or compression rate) $R_s$ can be defined as follows:

$$R_s = \frac{k_s}{n_s} \qquad \text{(Equation 1)}$$

Because the shaping rate $R_s$ is less than 1 (Rs<1), the shaping encoder of the communication system would function as forward error correction (FEC). Therefore, the constellation shaping performed by the shaping encoder would negatively affect the overall code rate. For example, assuming a desired code rate=5/6, if the shaping encoder applies a probabilistic QAM to a conventional communication system (e.g., LDPC coded modulation system 320), the overall code rate would be less than 5/6.

To solve this problem, according to certain aspects, embodiments in the present disclosure relate to a technique to use a shaping encoder (e.g., probabilistic shaping encoder) with LDPC to apply a constellation shaping to QAM modulations with different rates, thereby achieving a shaping gain of 1.53 dB. The shaping gain may refer to (1) an increase in information rate (e.g., average entropy per symbol) achieved by a constellation shaping compared to a uniformly distributed constellation; or (2) an enhanced energy efficiency for the information rate achieved by the constellation shaping compared to the uniformly distributed constellation.

In some implementations, an LDPC-coded modulation system may include a shaping encoder, an adjustable encoder, and/or a symbol mapper. In some implementations, the symbol mapper may be a PAM symbol mapper. In some implementations, the modulation system may be implemented in baseband circuitry or transmitter circuitry of a communication system.

In some implementations, the shaping encoder may include an amplitude shaper and an amplitude-to-bits (Amp2Bits) converter. The amplitude shaper may receive input data (e.g., input binary values) and apply probabilistic constellation shaping to QAM symbols to produce amplitudes (e.g., amplitudes in $n_s$ dimensions, denoted by $A^{n_s}$) corresponding to the QAM symbols. The Amp2Bits converter may convert shaped amplitudes into binary values. For example, the shaping rate $R_s$ of the amplitude shaper may be 0.95 which is less than or equal to the entropy H of an amplitude A as follows:

$$R_s = 0.95 \leq H(A) \qquad \text{(Equation 2)}$$

In some implementations, the adjustable encoder may include an LDPC encoder and/or a parity puncture. Assuming the LDPC-coded modulation system uses M-ary QAM (or M-QAM), M-QAM can be treated as a cartesian product of two sqrt(M)-PAM such that each sqrt(M)-PAM has m bits. In other words, the QAM after the cartesian product can have 2m bits. Thus, the number of bits m in the real dimension of the M-QAM (or equivalently the number of bits m in the sqrt(M)-PAM) can be defined as follows:

$$m = \frac{\log_2 M}{2} \qquad \text{(Equation 3)}$$

For example, 4096-QAM (M=4096) is a cartesian product of 64-PAM×64-PAM such that each PAM has 6 bits (m=6). In other words, the QAM can have 6 bits in the real dimension and 6 bits in imaginary dimensions, and have 12 bits in total.

In some implementations, the adjustable encoder (or the LDPC-coded modulation system) may identify/determine/ obtain a target code rate $R_{target}$ of the LDPC-coded modulation system (e.g., code rate of 5/6). The adjustable encoder (or the LDPC-coded modulation system) may determine (e.g., identify, adjust, calculate, compute), based on the target code rate $R_{target}$, one or more parameters including at least one of (1) a code rate $R_c$ of an LDPC code (or code rate of the LDPC encoder) or (2) a number of a first set of bits $(L_u)$ to be input to the LDPC encoder without being output from the shaping encoder. In some implementations, the adjustable encoder (or the LDPC-coded modulation system) may determine the one or more parameters using the following equation:

$$R_{target} = \frac{m-1}{m} \left( \frac{1}{1 - \frac{L_u}{N \cdot R_c}} \right),$$ (Equation 4)

where N is the number of input information bits of the LDPC encoder.

In some implementations, the LDPC encoder may receive (1) $(N \cdot R_c - L_u)$ bits from an output of the shaping encoder, and (2) $L_u$ bits from the input data (e.g., input binary values). The LDPC encoder may encode $N \cdot R_c$ bits using the code rate $R_c$ to produce encoded data. The parity puncture may puncture some parity bits from the encoded data. In some implementations, the code rate of the LDPC encoder (or code rate of the LDPC code used in the LDPC encoder) may be set/adjusted to a code rate $R_c$ that is higher than the code rate of $R_{target}$. For example, $R_c$ is 7/8 which is higher than the code rate $R_{target}$ of 5/6. In some implementations, the parity of the encoded data may be uniformly distributed.

In some implementations, the adjustable encoder may encode data at an overall code rate R (e.g., actual code rate or actually achieved code rate) as follows:

$$
\begin{aligned}
R &= \frac{(m-1)L_u + (K - L_u)(m-1)R_s}{m(K - L_u)} \quad \text{(Equation 5)} \\
&= \frac{(m-1)L_u}{m(K - L_u)} + \frac{(m-1)R_s}{m} \\
&= \frac{L_u}{N \cdot R_c} R_{target} + \frac{(m-1)R_s}{m} \quad , \\
&= \frac{m-1}{m} \left( \frac{\frac{L_u}{N \cdot R_c}}{1 - \frac{L_u}{N \cdot R_c}} \right) + \frac{(m-1)R_s}{m}
\end{aligned}
$$

where K is the number of output information bits of the LDPC encoder $$\left( R_c = \frac{K}{N} \right).$$

In some implementations, the overall rate R may be a function of at least one of a shaping codebook (e.g., one or more shaping codes), one or more shaping factors (e.g., shaping scheme, shaping rate, shaping gain), an FEC code rate (e.g., code rate $R_c$ of the LDPC encoder), or a puncture length.

In some implementations, the PAM symbol mapper may be a sqrt(M)-PAM which functions as a stream parser to QAM. The PAM symbol mapper may receive (1) an output of the Amp2Bits converter (e.g., output binary values) and (2) an output of the parity puncture (or an output of the LDPC encoder if there is no parity puncture in the system), and convert the received data (e.g., binary data) into analog waveforms for transmission.

In some implementations, a combination of the shaping encoder and the LDPC encoder (or a combination of the shaping encoder and the adjustable encoder) can act/function as a coded modulation system with a different rate by selecting one or more parameters (e.g., $R_c$ or $L_u$) to achieve a target code rate (e.g., $R_{target}$).

In some implementations, parameters can be selected to achieve the overall code rate R of 5/6 even with probabilistic QAM. For example, if the target code rate $R_{target}$ is 5/6, parameters can be chosen such that m, s are fixed per M-QAM (e.g., according to Equation 3); $R_c=7/8$; $L_u=81$; and/or N=1944. Using these parameters, the LDPC-coded modulation system can achieve not only the overall code rate R of 5/6 but also achieve the same spectral efficiency (10 bits) as MCS13 (Modulation and Coding Scheme (MCS) index 13) and the shaping gain of 1.53 dB.

In some implementations, the shaping encoder can use a shaping codebook including one or more shaping codes. For example, the shaping codebook may include a shaping code for 4096-QAM with LDPC code rate of 7/8 to achieve the shaping rate ($R_s$) of 0.952, the overall code rate (R) of 5/6, and the same spectral efficiency as MCS13. The shaping code may include a plurality of mappings (e.g., 32 mappings) from input binary data (e.g., 4-bit string, 5-bit string, 6-bit string, 7-bit string, 8-bit string) to output binary data (e.g., 5-bit string), with different probabilities. For example, one or more mappings from a 4-bit string to a 5-bit string may have the probability of 1/16; one or more mappings from a 5-bit string to a 5-bit string may have the probability of 1/32; one or more mappings from a 6-bit string to a 5-bit string may have the probability of 1/64; one or more mappings from a 7-bit string to a 5-bit string may have the probability of 1/128; and/or one or more mappings from an 8-bit string to a 5-bit string may have the probability of 1/256. For example, using the shaping code, the shaping encoder can shape/map/convert/assign an input string of [1111110] into an output string of [11100] with the probability of 1/128.

In some implementations, the shaping encoder can use a prefix free code to shape/map/convert/assign an input string with a variable length (e.g., string with 4, 5, 6, 7, 8 bits) into an output string with a fixed length (e.g., string with 5 bits). A prefix free code refers to a code such that no codeword (generated using the code) is a prefix of another codeword. In some implementations, the mappings defined by the prefix free code may be invertible operations such that each mapping is a one-to-one mapping. In some implementations, the shaping encoder may apply a Huffman coding approach using the prefix free code. For example, the shaping encoder may use the prefix free code to shape/map/convert/assign variable length input strings to fixed length output strings based on the frequencies of the input strings. In some implementations, the shaping encoder may use a tree structure of the prefix free code so that Huffman decoding can be performed using the tree structure. In some implementations, the shaping encoder may use other structure representing the prefix free code (e.g., look-up table or dictionary) so that Huffman decoding can be performed using the same structure. In some implementations, the shaping encoder may receive uniformly distributed input data and induce/assign non-uniform probabilities to output data. This probabilistic constellation shaping may have inherent rate loss such that the shaping encoder acts/functions as FEC. In some implementations, given input strings or symbols X, the prefix free code can be used to map/assign/shape/convert N different number of input strings or N different symbols (e.g., N=32); a maximum entropy may be 5 bits/symbol (e.g., $H_0(X)=5$ bits/symbol); an average entropy may be 4.71 bits/symbol (e.g., $H(X)=4.71$ bits/symbol); an average codeword (CW) length may be 4.71 bits/CW; $p(X=0)=0.5$; $p(X=1)=0.5$.

In some implementations, an LDPC-coded demodulation system may include a parser, a decoder (e.g., sphere decoder), a de-parser, an LDPC decoder and/or a shaping decoder. In some implementations, the demodulation system may be implemented in baseband circuitry of a communication system configured to receive encoded data from another communication system. In some implementations, the demodulation system may use a decoding approach such as soft-input maximum likelihood (SiML) and/or sphere maximum a posteriori (sphere MAP) to implement a non-linear receiver which is more optimal than a linear receiver. The demodulation system may (1) receive encoded data Y (e.g., $Y^{(1)}$, $Y^{(2)}$), (2) decode, by the sphere decoder based on a probability of symbol s (e.g., $P_s$) and/or log likelihood ratio (LLR) values (e.g., $$L_E^{(1)}, L_E^{(2)}),$$

the data Y to produce decoded data X (e.g., $X^{(1)}$, $X^{(2)}$), (3) obtain, by the de-parser from the decoded data X, de-parsed data, (4) decode, by the LDCP decoder, the de-parsed data to produce LDPC-decoded data, (5) parse, by the parser, the LDPC-decoded data to produce likelihood values (e.g., $$L_E^{(1)}, L_E^{(2)}),$$

and/or (6) shape decode, by the shaping decoder using a shaping code, the LDPC-decoded data to produce original data $\hat{X}$.

In some implementations, the sphere decoder can determine whether $x_{i,b}$ is 0 or 1 using the following equation:

$$L_{i,b}^{det} = \log \frac{P(x_{i,b} = 0 \mid \hat{y}, R)}{P(x_{i,b} = 1 \mid y, R)} \qquad \text{(Equation 6)}$$

$$\overset{(Bayes)}{=} \log \sum_{s \in x_{i,b}^0} p(\hat{y} \mid s, R) P(s) - \log_{s \in x_{i,b}^1} p(\hat{y} \mid s, R) P(s)$$

$$\overset{max-log}{\approx} \underbrace{\min_{s \in x_{i,b}^1} \left\{ \frac{1}{N_0} \|y - Rs\|^2 - \log P(s) \right\}}_{\overset{\triangle}{=} d(s)} -$$

$$\min_{s \in x_{i,b}^0} \left\{ \frac{1}{N_0} \|\hat{y} - Rs\|^2 - \log P(s) \right\}$$

where $$L_{i,b}^{det}$$

is an LLR value indicating whether $x_{i,b}$ is 0 or 1; R is a code rate; s is a symbol having a corresponding probability P(s). In some implementations, P(s) may be a product of two probabilities defined in a shaping code (e.g., probabilities corresponding to two indexes of the shaping code).

In some implementations, an LDPC-coded demodulation system may include a multiple-input multiple-output (MIMO) de-mapper, an LLR (or LLR calculator), an LDPC decoder, and/or a shaping decoder. In some implementations, the demodulation system may be implemented in baseband circuitry of a communication system configured to receive encoded data from another communication system. In some implementations, the demodulation system may use a minimum mean-squared error (MMSE) decoding to implement a linear receiver which is more easy to implement than a non-linear receiver. The demodulation system may (1) receive encoded data Y in analog waveforms, (2) de-map the analog waveforms into $\log_2$ M values (of an M-ary signal constellation (e.g., 1024 QAM)), (3) calculate/compute/determine, by the LLR calculator based on a probability of symbol s (e.g., $P_s$), LLR values, (4) decode, by the LDCP decoder, the LLR values to produce LDPC-decoded data, and/or (5) shape decode, by the shaping decoder using a shaping code, the LDPC-decoded data to produce original data $\hat{X}$ (e.g., binary data). In some implementations, the LLR calculator can calculate the LLR values by absorbing P(s) and MMSE variance $\sigma^2$ as follows:

$$L_{i,b} = \log \frac{P(x_{i,b} = 1 \mid \hat{y}, H)}{P(x_{i,b} = 0 \mid \hat{y}, H)} \qquad \text{(Equation 7)}$$

$$\approx \log \frac{P(x_{i,b} = 1 \mid \hat{y}_i, H)}{P(x_{i,b} = 0 \mid \hat{y}_i, H)}$$

$$\approx \log \sum_{a \in x_b^{(1)}} \exp \left( \frac{-|\hat{y}_i - a|^2}{\sigma_i^2} - \log P(s_i = a) \right) -$$

$$\log \sum_{a \in x_b^{(0)}} \exp \left( \frac{-|\hat{y}_i - a|^2}{\sigma_i^2} - \log P(s_i = a) \right)$$

$$\approx \min_{a \in x_b^{(1)}} \left( \frac{-|\hat{y}_i - a|^2}{\sigma_i^2} - \log p(s_i = a) \right) -$$

$$\min_{a \in x_b^{(0)}} \left( \frac{-|\hat{y}_i - a|^2}{\sigma_i^2} - \log P(s_i = a) \right)$$

where $L_{i,b}$ is an LLR value indicating whether $x_{i,b}$ is 0 or 1; H is an entropy; $s_i$ is a symbol having a corresponding probability $P(s_i)$. In some implementations, the LDPC-coded demodulation system may be implemented by reusing components thereof except the LLR calculator. For example, the LDPC-coded demodulation system may be implemented by reusing the MIMO de-mapper, the LDPC decoder and the shaping decoder, and adding (or newly implementing) the LLR calculator. In some implementations, the LLR calculator can be implemented using a look-up table.

In some implementations, an apparatus may include a transmitter and one or more processors. The one or more processors may be configured to identify, by a low-density parity-check (LDPC) encoder, a target code rate for which to encode data. The one or more processors may be configured to receive, by the LDPC encoder, a first set of information bits. The one or more processors may be configured to receive, by the LDPC encoder from an output of a shaping encoder, a second set of information bits. The one or more processors may be configured to adjust a code rate of an LDPC code to a second code rate higher than the target code rate to cause the LDPC encoder to encode the data at the target code rate. The one or more processors may be configured to encode the data using the LDPC code. The transmitter may be configured to transmit the encoded data.

In some implementations, an apparatus may include a transmitter and one or more processors. The one or more processors may identify, by a low-density parity-check (LDPC) encoder, a target code rate for which to encode data. The one or more processors may receive, by the LDPC encoder, a first set of information bits. The one or more processors may receive, by the LDPC encoder from an output of a shaping encoder, a second set of information bits. The one or more processors may adjust a code rate of an LDPC code to a second code rate higher than the target code rate to cause the LDPC encoder to encode the data at the target code rate. The one or more processors may encode the data using the LDPC code. The transmitter may transmit the encoded data.

In some implementations, the one or more processors may be further configured to adjust the number of bits in the first set and the number of bits in the second set to encode the data at the target code rate. The target rate may be 5/6, the second code rate may be 7/8, and the number of bits in the first set may be 81. In some implementations, the first set of information bits may not be output from the shaping encoder.

In some implementations, the one or more processors may be configured to puncture one or more bits from an output of the LDPC encoder to generate a punctured output of the LDPC encoder. The one or more processors may be configured to provide an output of the shaping encoder and the punctured output of the LDPC encoder to a symbol mapper.

In some implementations, the one or more processors may be configured to apply, by the shaping encoder, a shaping code to the data. The shaping code may represent a code for probabilistic constellation shaping. The shaping code may include one or more first mappings from a 4-bit string to a 5-bit string with a probability of 1/16, one or more second mappings from a 5-bit string to a 5-bit string with a probability of 1/32, one or more third mappings from a 6-bit string to a 5-bit string with a probability of 1/64, one or more fourth mappings from a 7-bit string to a 5-bit string with a probability of 1/128, and one or more fifth mappings from a 8-bit string to a 5-bit string with a probability of 1/256.

In some implementations, the one or more first mappings may include ([0000], [01111]), ([0001], [01110]), ([0010], [01100]), ([0011], [01101]), ([0100], [01001]), ([0101], [01000]), ([0110], [01010]), and ([0111], [01011]). The one or more second mappings may include ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]). The one or more third mappings may include ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]). The one or more fourth mappings may include ([1111110], [11100]). The one or more fifth mappings may include ([11111110], [11110]) and ([11111111], [11111]).

In some implementations, an apparatus may include a receiver and one or more processors. The receiver may be configured to receive encoded data. The one or more processors may be configured to receive, by a low-density parity-check (LDPC) decoder from the encoded data based on a shaping code, log-likelihood ratio (LLR) values corresponding to the encoded data. The one or more processors may be configured to decode, by the LDPC decoder, the LLR values using an LDPC code. The one or more processors may be configured to apply, by a shaping decoder, the shaping code to the decoded LLR values to obtain decoded data corresponding to the encoded data.

In some implementations, the shaping code may include one or more first mappings from a 4-bit string to a 5-bit string with a probability of 1/16, one or more second mappings from a 5-bit string to a 5-bit string with a probability of 1/32, one or more third mappings from a 6-bit string to a 5-bit string with a probability of 1/64, one or more fourth mappings from a 7-bit string to a 5-bit string with a probability of 1/128, and one or more fifth mappings from a 8-bit string to a 5-bit string with a probability of 1/256.

In some implementations, the one or more first mappings may include ([0000], [01111]), ([0001], [01110]), ([0010], [01100]), ([0011], [01101]), ([0100], [01001]), ([0101],

[01000]), ([0110], [01010]), and ([0111], [01011]). The one or more second mappings may include ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]). The one or more third mappings may include ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]). The one or more fourth mappings may include ([1111110], [11100]). The one or more fifth mappings may include ([11111110], [11110]) and ([11111111], [11111]).

Embodiments in the present disclosure have at least the following advantages and benefits. First, embodiments in the present disclosure can provide useful techniques for (1) designing appropriate shaping codes (e.g., shaping code-book, prefix free code) and/or (2) adjusting modulation/demodulation processing based on a target code rate ($R_{target}$), thereby achieving a fine control of the overall rate (R).

Second, embodiments in the present disclosure can provide useful techniques for selecting parameters such as LDPC code rate (e.g., $R_c$=7/8) and/or the number of information bits (e.g., $L_u$=81) with 95% shaping (or compression) rate (e.g., $R_s$=0.95), resulting in the overall code rate of 5/6.

Third, embodiments in the present disclosure can provide useful techniques for 3. achieving shaping gain of 1.53 dB. thereby achieving the shaping gain of 1.53 dB (or higher in impair limited systems) when high spectral efficiency QAM modulation is used.

Figure 6:
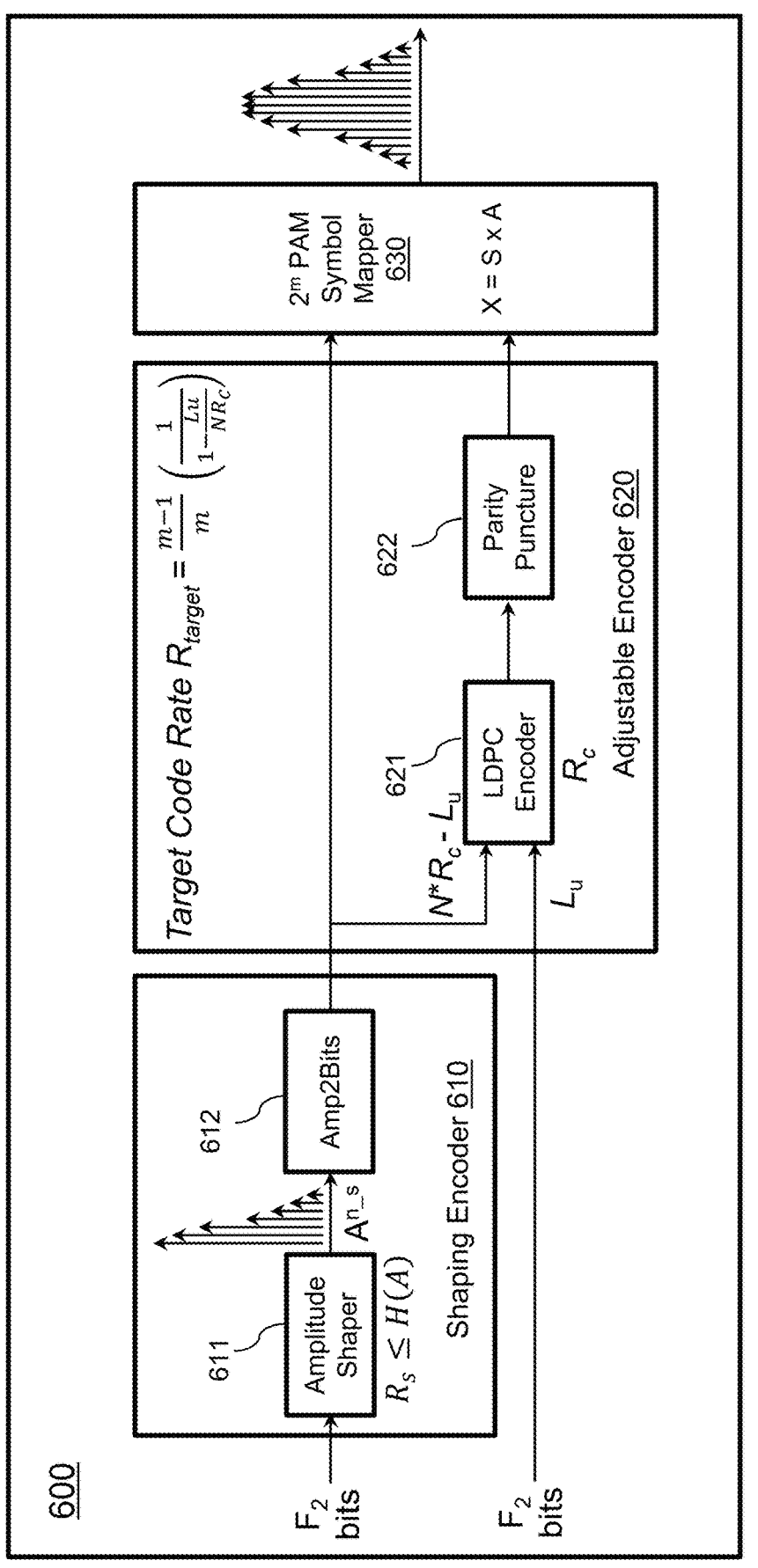
FIG. 6 is a diagram depicting an example LDPC-coded modulation system including a shaping encoder and an LDPC encoder, according to one or more embodiments.

FIG. 6 is a diagram depicting an example LDPC-coded modulation system 600, according to one or more embodiments. The LDPC-coded modulation system 600 may include a shaping encoder 610, an adjustable encoder 620, and/or a symbol mapper 630. The symbol mapper 630 may be a PAM symbol mapper. The modulation system 600 may be implemented in baseband circuitry (e.g., baseband circuitry 110) or transmitter circuitry (e.g., transmitter circuitry) of a communication system (e.g., communication system 105).

The shaping encoder 610 may include an amplitude shaper 611 and an amplitude-to-bits (Amp2Bits) converter 612. The amplitude shaper 611 may receive input data (e.g., input binary values) and apply probabilistic constellation shaping to QAM symbols to produce amplitudes (e.g., amplitudes in $n_s$ dimensions, denoted by $A^{n_s}$) corresponding to the QAM symbols. The Amp2Bits converter 612 may convert shaped amplitudes into binary values. For example, the shaping rate $R_s$ of the amplitude shaper may be 0.95 which is less than or equal to H(A) (see Equation 2).

The adjustable encoder 620 may include an LDPC encoder 621 and/or a parity puncture 622. Assuming the LDPC-coded modulation system uses M-ary QAM (or M-QAM), M-QAM can be treated as a cartesian product of two sqrt(M)-PAM such that each sqrt(M)-PAM has m bits. In other words, the QAM after the cartesian product can have 2m bits. Thus, the number of bits m in the real dimension of the M-QAM (or equivalently the number of bits m in the sqrt(M)-PAM) can be defined using Equation 3. For example, 4096-QAM (M=4096) is a cartesian product of 64-PAM×64-PAM such that each PAM has 6 bits (m=6). In other words, the QAM can have 6 bits in the real dimension and 6 bits in imaginary dimensions, and have 12 bits in total.

The adjustable encoder 620 (or the LDPC-coded modulation system 600) may identify/determine/obtain a target code rate $R_{target}$ of the LDPC-coded modulation system (e.g., code rate of 5/6). The adjustable encoder 620 (or the LDPC-coded modulation system 600) may determine (e.g., identify, adjust, calculate, compute), based on the target code rate $R_{target}$, one or more parameters including at least one of (1) a code rate $R_c$ of an LDPC code (or code rate of the LDPC encoder) or (2) a number of a first set of bits (Lu) to be input to the LDPC encoder 621 without being output from the shaping encoder 610. The adjustable encoder 620 (or the LDPC-coded modulation system 600) may determine the one or more parameters (e.g., $R_c$, $L_u$) using Equation 4.

The LDPC encoder 621 may receive (1) ($N \cdot R_c - L_u$) bits from an output of the shaping encoder 610, and (2) $L_u$ bits from the input data (e.g., input binary values). The LDPC encoder 621 may encode $N \cdot R_c$ bits using the code rate $R_c$ to produce encoded data. The parity puncture 622 may puncture some parity bits from the encoded data. The code rate of the LDPC encoder 621 (or code rate of the LDPC code used in the LDPC encoder 621) may be set/adjusted to a code rate $R_c$ that is higher than the code rate of $R_{target}$. For example, $R_c$ may be set to 7/8 which is higher than the code rate $R_{target}$ of 5/6. The parity of the encoded data may be uniformly distributed.

The adjustable encoder 620 may encode data at an overall code rate R (e.g., actual code rate or actually achieved code rate) which can be calculated using Equation 5. The overall rate R may be a function of at least one of a shaping codebook (e.g., one or more shaping codes), one or more shaping factors (e.g., shaping scheme, shaping rate, shaping gain), an FEC code rate (e.g., code rate $R_c$ of the LDPC encoder), or a puncture length.

The PAM symbol mapper 630 may be a sqrt(M)-PAM which functions as a stream parser to QAM. The PAM symbol mapper 630 may receive (1) an output of the Amp2Bits converter (e.g., output binary values) and (2) an output of the parity puncture (or an output of the LDPC encoder if there is no parity puncture in the system), and convert the received data (e.g., binary data) into analog waveforms for transmission.

Referring to FIG. 6, a combination of the shaping encoder 610 and the LDPC encoder 621 (or a combination of the shaping encoder 610 and the adjustable encoder 620) can act/function as a coded modulation system with a different rate by selecting one or more parameters (e.g., $R_c$ or $L_u$) to achieve a target code rate (e.g., $R_{target}$). Parameters can be selected to achieve the overall code rate R of 5/6 even with probabilistic QAM. For example, if the target code rate $R_{target}$ is 5/6, parameters can be chosen such that m, s are fixed per M-QAM (e.g., according to Equation 3); $R_c$=7/8; $L_u$=81; and/or N=1944. Using these parameters, the LDPC-coded modulation system 600 can achieve not only the overall code rate R of 5/6 but also achieve the same spectral efficiency (10 bits) as MCS13 and the shaping gain of 1.53 dB.

Figure 7B:
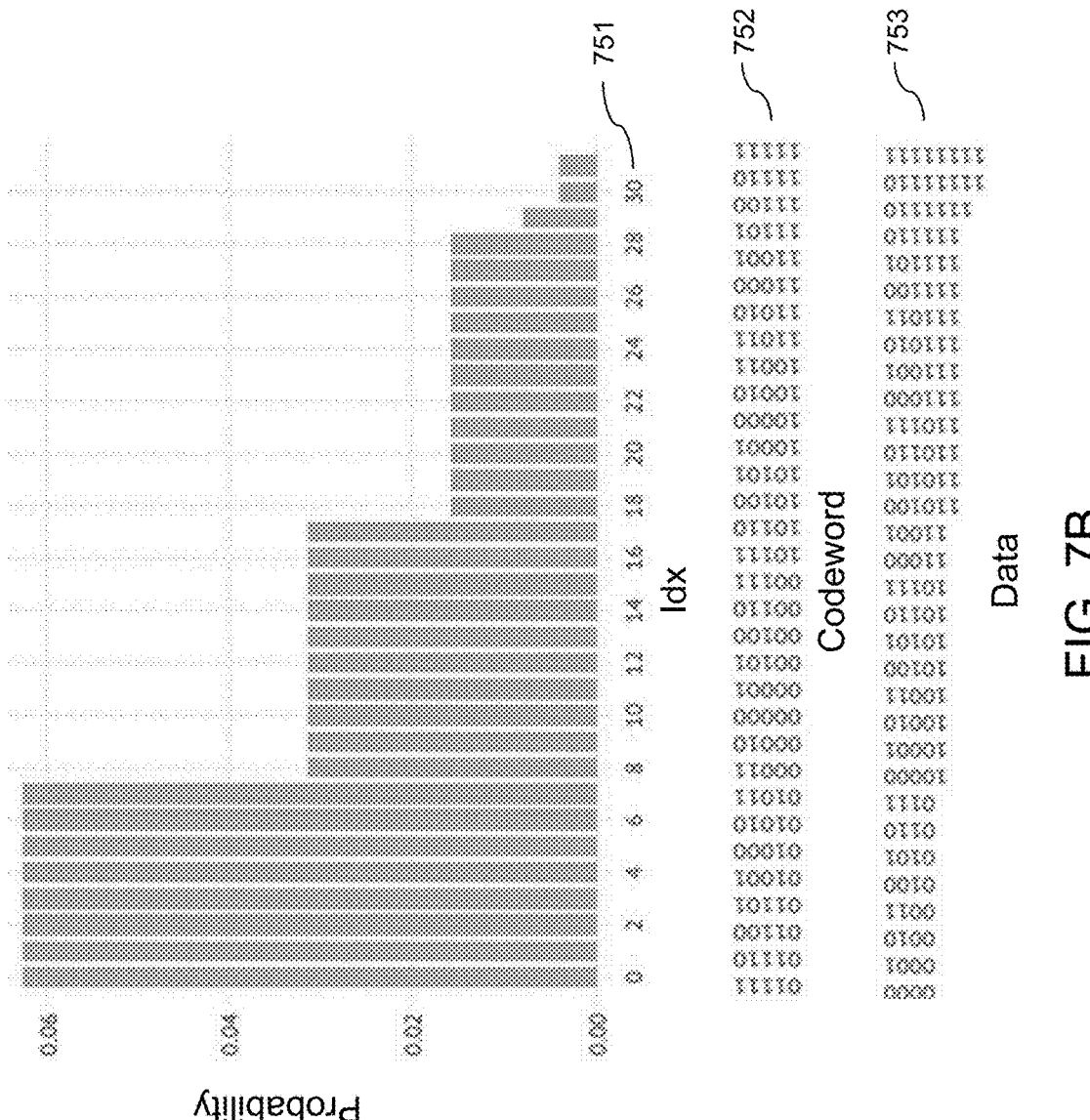

FIG. 7A and FIG. 7B are diagrams 700, 750 depicting an example shaping code, according to one or more embodiments. The shaping encoder (e.g., shaping encoder 610) can use a shaping codebook including one or more shaping codes. For example, the shaping codebook may include a shaping code 700 as shown in FIG. 7A for 4096-QAM with LDPC code rate of 7/8 to achieve the shaping rate ($R_s$) of 0.952, the overall code rate (R) of 5/6, and the same spectral efficiency as MCS13. The shaping code 700 may include a plurality of mappings (e.g., 32 mappings indexed 701 by 1-32) from input binary data 702 with length 704 (e.g., 4-bit string, 5-bit string, 6-bit string, 7-bit string, 8-bit string) to output binary data 705 (e.g., 5-bit string), with different probabilities. For example, one or more mappings from a 4-bit string to a 5-bit string (e.g., mappings 1-8) may have the probability of 1/16; one or more mappings from a 5-bit string to a 5-bit string (e.g., mappings 9-18) may have the probability of 1/32; one or more mappings from a 6-bit string to a 5-bit string (e.g., mappings 19-29) may have the probability of 1/64; one or more mappings from a 7-bit string to a 5-bit string (e.g., mapping 30) may have the probability of 1/128; and/or one or more mappings from an 8-bit string to a 5-bit string (e.g., mappings 31-32) may have the probability of 1/256. For example, using the shaping code, the shaping encoder 610 can shape/map/convert/assign an input string of [1111110] into an output string of [11100] with the probability of 1/128 (see the mapping 30). FIG. 7B shows a histogram 750 depicting a probability distribution over the mapping index 751, codeword 752, and input data 753.

Figure 8:
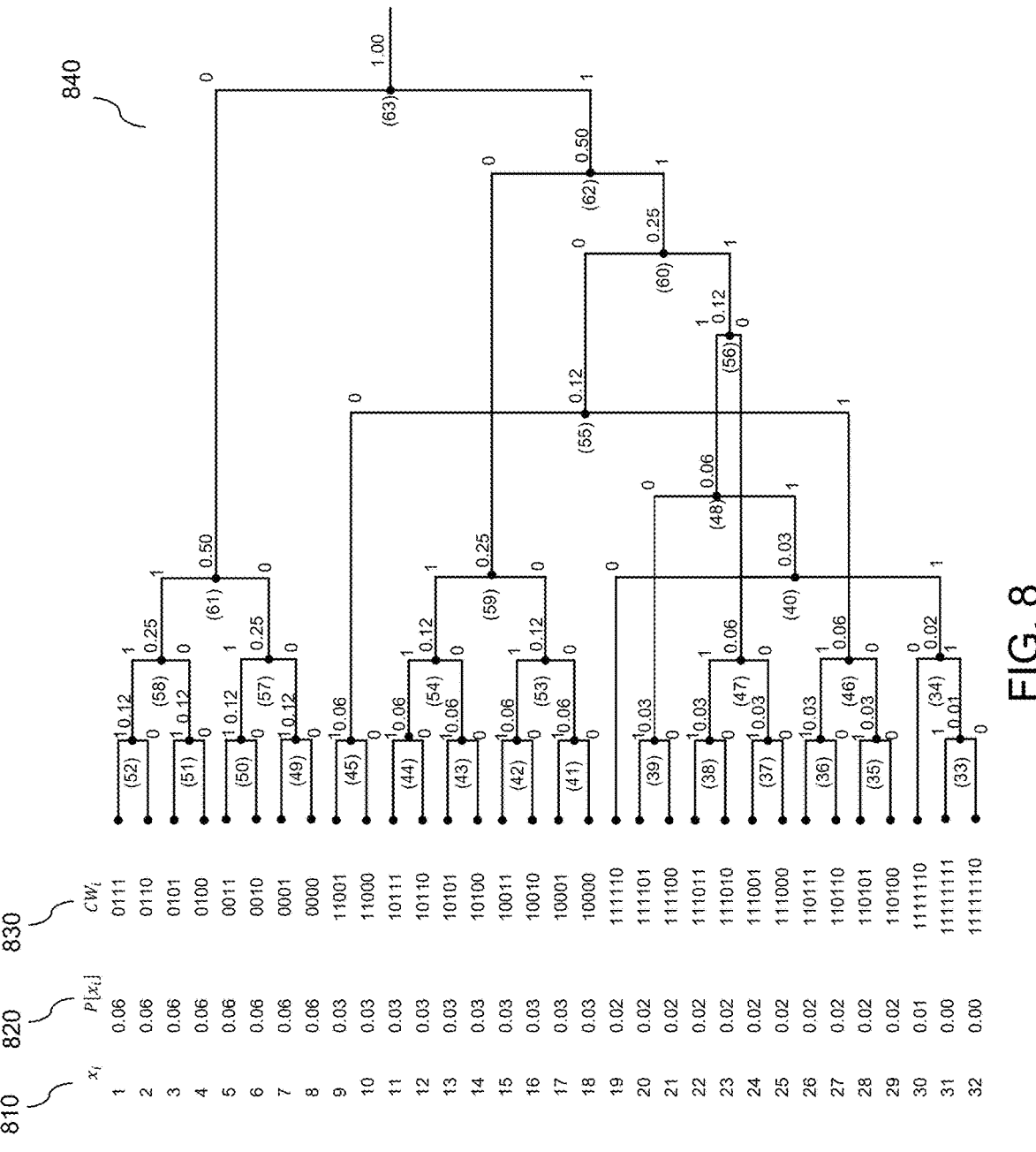
FIG. 8 is a diagram depicting probabilistic constellation shaping using a prefix free code, according to one or more embodiments.

FIG. 8 is a diagram 800 depicting probabilistic constellation shaping using a prefix free code 840, according to one or more embodiments. The shaping encoder (e.g., shaping encoder 610) can use the prefix free code 840 to shape/map/convert/assign an input string 830 with a variable length (e.g., string with 4, 5, 6, 7, 8 bits) into an output string 810 with a fixed length (e.g., string with 5 bits). The mappings defined by the prefix free code 840 may be invertible operations such that each mapping is a one-to-one mapping. The shaping encoder may apply a Huffman coding approach using the prefix free code 840. For example, the shaping encoder may use the prefix free code 840 to shape/map/convert/assign variable length input strings to fixed length output strings based on the frequencies of the input strings (e.g., $P[x_i]$820). The shaping encoder may use a tree structure of the prefix free code so that Huffman decoding can be performed using the tree structure. For example, the tree structure of the prefix free code 840 may be a binary tree constructed such that a node corresponding to the input string 830 has a depth corresponding to the length of the input string 830 (e.g., depth=4, 5, 6, 7, or 8). The shaping encoder may use other structure representing the prefix free code (e.g., look-up table or dictionary) so that Huffman decoding can be performed using the same structure. The shaping encoder may receive uniformly distributed input data and induce/assign non-uniform probabilities to output data. This probabilistic constellation shaping may have inherent rate loss such that the shaping encoder acts/functions as FEC. Given input strings or symbols X, the prefix free code can be used to map/assign/shape/convert N different number of input strings or N different symbols (e.g., N=32); a maximum entropy may be 5 bits/symbol (e.g., $H_0(X)$=5 bits/symbol); an average entropy may be 4.71 bits/symbol (e.g., H(X)=4.71 bits/symbol); an average codeword (CW) length may be 4.71 bits/CW; p(X=0)=0.5; p(X=1)=0.5.

Figure 9:
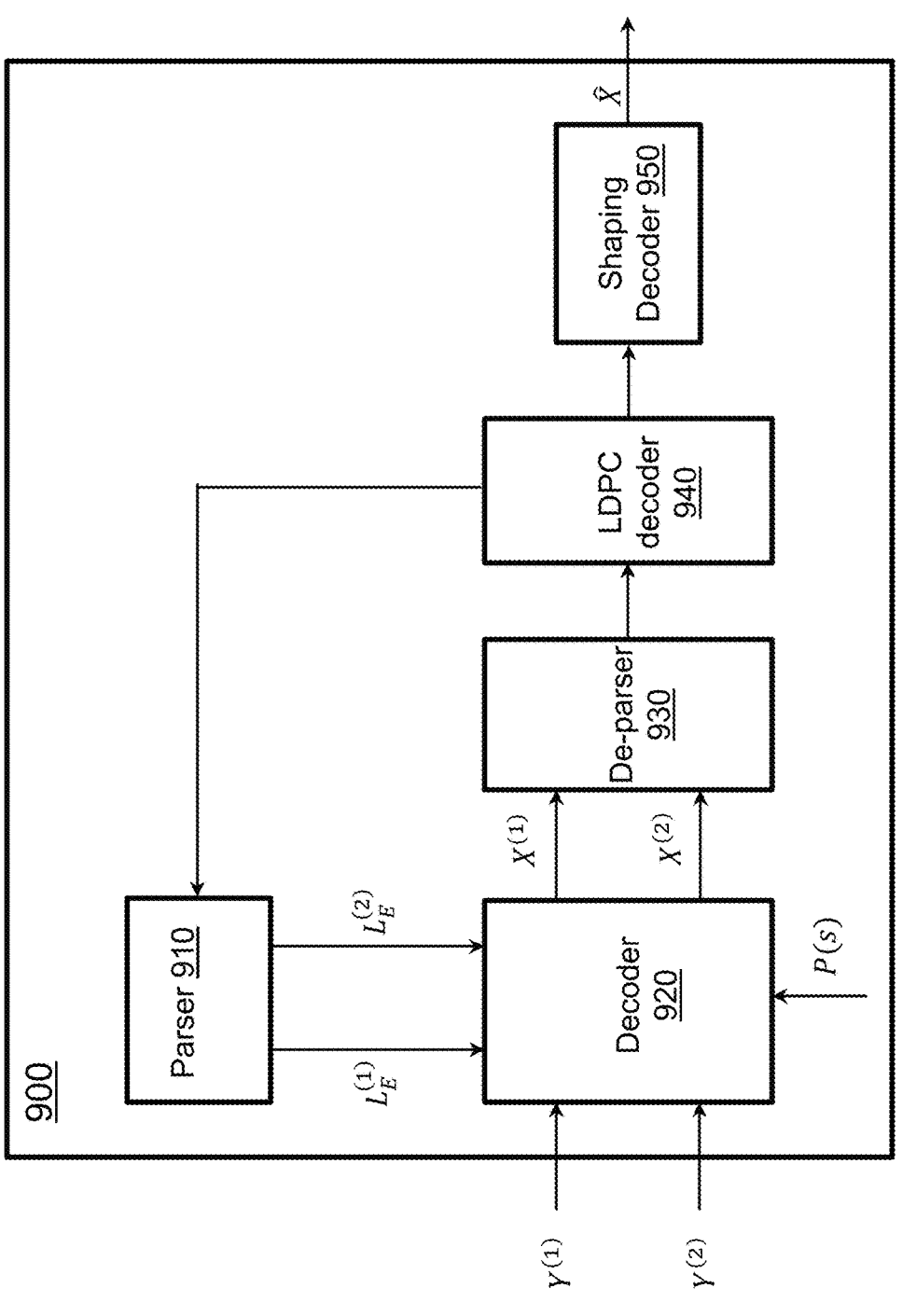
FIG. 9 is a diagram depicting an example LDPC-coded demodulation system including an LDPC decoder and a shaping decoder, according to one or more embodiments.

FIG. 9 is a diagram depicting an example LDPC-coded demodulation system 900, according to one or more embodiments. The LDPC-coded demodulation system 900 may include a parser 910, a decoder 920 (e.g., sphere decoder), a de-parser 930, an LDPC decoder 940 and/or a shaping decoder 950. The demodulation system 900 may be implemented in baseband circuitry (e.g., baseband circuitry 150) or receiver circuitry (e.g., receiver circuitry 140) of a communication system (e.g., communication system 108) configured to receive encoded data from another communication system (e.g., communication system 105). The demodulation system 900 may use a decoding approach such as SiML and/or sphere MAP to implement a non-linear receiver which is more optimal than a linear receiver. The demodulation system 900 may (1) receive encoded data Y (e.g., $Y^{(1)}$, $Y^{(2)}$), (2) decode, by the sphere decoder 920 based on a probability of symbol s (e.g., $P_s$) and/or log likelihood ratio (LLR) values (e.g., $$L_E^{(1)}, L_E^{(2)}),$$

the data Y to produce decoded data X (e.g., $X^{(1)}$, $X^{(2)}$), (3) obtain, by the de-parser 930 from the decoded data X, de-parsed data, (4) decode, by the LDCP decoder 940, the de-parsed data to produce LDPC-decoded data, (5) parse, by the parser 910, the LDPC-decoded data to produce likelihood values (e.g., $$L_E^{(1)}, L_E^{(2)}),$$

and/or (6) shape decode, by the shaping decoder 950 using a shaping code (e.g., shaping codes shown in FIG. 7A and FIG. 8), the LDPC-decoded data to produce original data $\hat{X}$. The sphere decoder 920 can determine, based on probability P(s), whether $x_{i,b}$ is 0 or 1 using Equation 6. In some implementations, P(s) may be a product of two probabilities defined in a shaping code (e.g., probabilities corresponding to two indexes of the shaping code).

Figure 10:
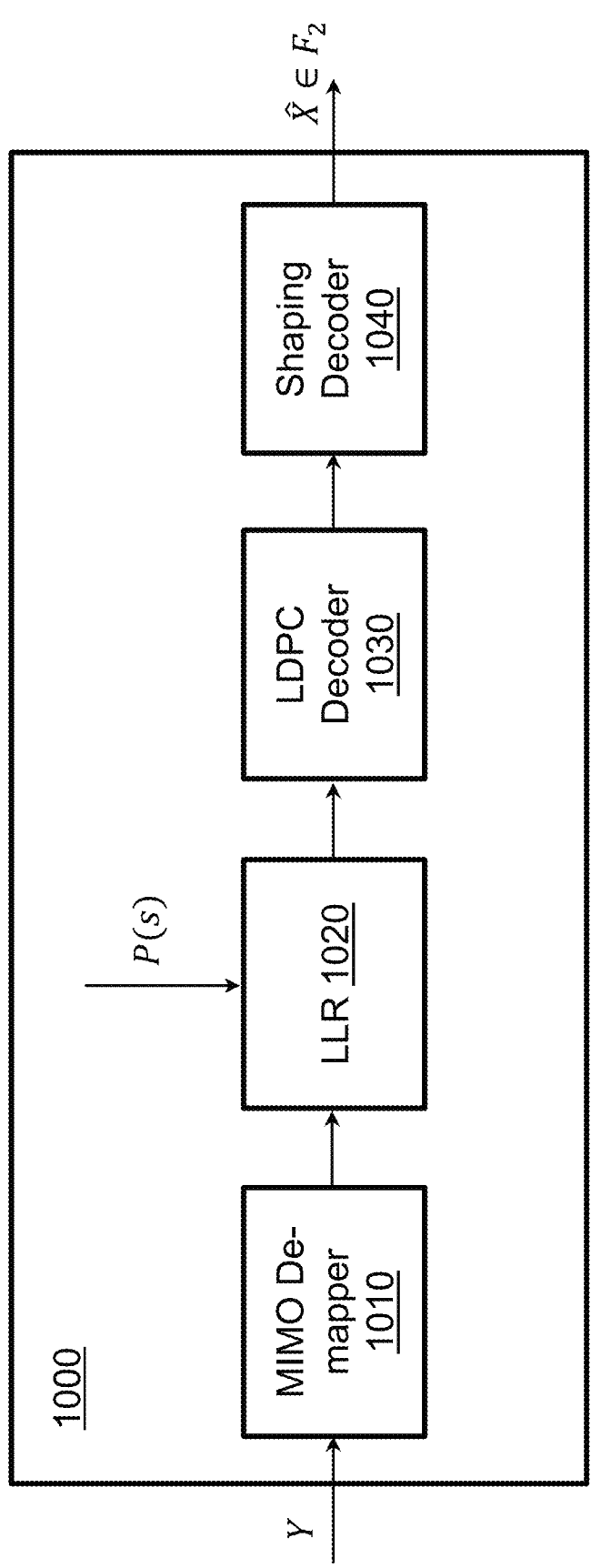
FIG. 10 is a diagram depicting an example LDPC-coded demodulation system including an LDPC decoder and a shaping decoder, according to one or more embodiments.

FIG. 10 is a diagram depicting an example LDPC-coded demodulation system 1000, according to one or more embodiments. The LDPC-coded demodulation system 1000 may include a MIMO de-mapper 1010, an LLR (or LLR calculator) 1020, an LDPC decoder 1030, and/or a shaping decoder 1040. The demodulation system 1000 may be implemented in baseband circuitry (e.g., baseband circuitry 150) or receiver circuitry (e.g., receiver circuitry 140) of a communication system (e.g., communication system 108) configured to receive encoded data from another communication system (e.g., communication system 105). The demodulation system 1000 may use a minimum mean-squared error (MMSE) decoding to implement a receiver which is more easy to implement than a non-linear receiver. In some implementations, the LDPC-coded demodulation system 1000 may be implemented by reusing components thereof except the LLR calculator 1020. For example, the LDPC-coded demodulation system 1000 may be implemented by reusing the MIMO de-mapper 1010, the LDPC decoder 1030 and the shaping decoder 1040, and adding (or newly implementing) the LLR calculator 1020. In some implementations, the LLR calculator 1020 can be implemented using a look-up table. The demodulation system 1000 may (1) receive encoded data Y in analog waveforms, (2) de-map, by the MIMO de-mapper 1010, the analog waveforms into $\log_2$ M values (of an M-ary signal constellation (e.g., 1024 QAM)), (3) calculate/compute/determine, by the LLR calculator 1020 based on a probability of symbol s (e.g., $P_s$), LLR values, (4) decode, by the LDCP decoder 1030, the LLR values to produce LDPC-decoded data, and/or (5) shape decode, by the shaping decoder 1040 using a shaping code (e.g., shaping codes shown in FIG. 7A and FIG. 8), the LDPC-decoded data to produce original data $\hat{X}$ (e.g., binary data). The LLR calculator 1020 can calculate the LLR values by absorbing P(s) and MMSE variance $\sigma^2$ using Equation 7.

FIG. 11 is a flow diagram showing a process 1100 for encoding data and/or decoding data using a shaping code and an LDPC code, in accordance with an embodiment. In some embodiments, the process 1100 is performed by one or more processors of a first device (e.g. encoder 130 or processor 2010 of communication system 105, modulation system 600) or by one or more processors of a second device (e.g., decoder 160 or processor 2010 of communication system 108, demodulation system 900, demodulation system 1000). In other embodiments, the process 1100 is performed by other entities (e.g., a computing system other than the communication system 105 or 108). In some embodiments, the process 1100 includes more, fewer, or different steps than shown in FIG. 11.

At step 1102, an LDPC encoder of a first device (e.g., modulation system 600, adjustable encoder 620, or LDPC encoder 621 of communication system 105) may identify a target code rate (e.g., code rate of 5/6) for which to encode data. At step 1104, the LDPC encoder of the first device (e.g., LDPC encoder 621) may receive a first set of information bits (e.g., $L_u$ number of information bits). At step 1106, the LDPC encoder of the first device may receive, from an output of a shaping encoder (e.g., shaping encoder 610), a second set of information bits (e.g., $(N*R_c-L_u)$ number of information bits). The first set of information bits e.g., $L_u$ number of information bits) may not be output from the shaping encoder 610.

In some implementations, the first device may apply, by the shaping encoder 610, a shaping code (e.g., shaping code 700 shown in FIG. 7A or shaping code 840 shown in FIG. 8) to the data. The shaping code may represent a code for probabilistic constellation shaping. In some implementations, the shaping code may include one or more first mappings from a 4-bit string to a 5-bit string with a probability of 1/16 (e.g., mappings 1-8 in FIG. 7A), one or more second mappings from a 5-bit string to a 5-bit string with a probability of 1/32 (e.g., mappings 9-18 in FIG. 7A), one or more third mappings from a 6-bit string to a 5-bit string with a probability of 1/64 (e.g., mappings 19-29 in FIG. 7A), one or more fourth mappings from a 7-bit string to a 5-bit string with a probability of 1/128 (e.g., mapping 30 in FIG. 7A), and one or more fifth mappings from a 8-bit string to a 5-bit string with a probability of 1/256 (e.g., mappings 31-32 in FIG. 7A).

In some implementations, the one or more first mappings (e.g., mappings 1-8 in FIG. 7A) may include ([0000], [01111]), ([0001], [01110]), ([0010], [01100]), ([0011], [01101]), ([0100], [01001]), ([0101], [01000]), ([0110], [01010]), and ([0111], [01011]). The one or more second mappings (e.g., mappings 9-18 in FIG. 7A) may include ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]). The one or more third mappings (e.g., mappings 19-29 in FIG. 7A) may include ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]). The one or more fourth mappings (e.g., mapping 30 in FIG. 7A) may include ([1111110], [11100]). The one or more fifth mappings (e.g., mappings 31-32 in FIG. 7A) may include ([11111110], [11110]) and ([11111111], [11111]).

At step 1108, one or more processors of the first device may adjust a code rate of an LDPC code to a second code rate (e.g., $R_c$=7/8) higher than the target code rate (e.g., $R_{target}$=5/6) to cause the LDPC encoder to encode the data at the target code rate (e.g., $R_{target}$=5/6).

In some implementations, the first device may adjust the number of bits in the first set (e.g., $L_u$) and the number of bits in the second set (e.g., N*$R_c$–$L_u$) to encode the data at the target code rate. The target rate may be 5/6. The second code rate may be 7/8. The number of bits in the first set may be 81.

At step 1110, the one or more processors of the first device may encode the data using the LDPC code. In some implementations, the first device (e.g., parity puncture 622) may puncture one or more bits from an output of the LDPC encoder to generate a punctured output of the LDPC encoder. The first device may provide an output of the shaping encoder (e.g., shaping encoder 610) and the punctured output of the LDPC encoder (e.g., the output from the parity puncture 622) to a symbol mapper (e.g., PAM symbol mapper 630). At step 1112, the one or more processors of the first device may transmit the encoded data.

In some implementations, a second device (e.g., communication system 108, receiver circuitry 140) may receive, from the first device (e.g., communication system 105, transmitter circuitry 120), the encoded data. An LDPC decoder (e.g., LDPC decoder 940, LDPC decoder 1030) of the second device may receive, from the encoded data based on the shaping code (e.g., shaping code 700 or shaping code 840), log-likelihood ratio (LLR) values corresponding to the encoded data. For example, the LDPC decoder 1030 may receive LLR values from the LLR calculator 1020. The LDPC decoder of the second device may decode the LLR values using an LDPC code. A shaping decoder of the second device (e.g., shaping decoder 950, 1040) may apply the shaping code to the decoded LLR values to obtain decoded data corresponding to the encoded data.

Figure 12:
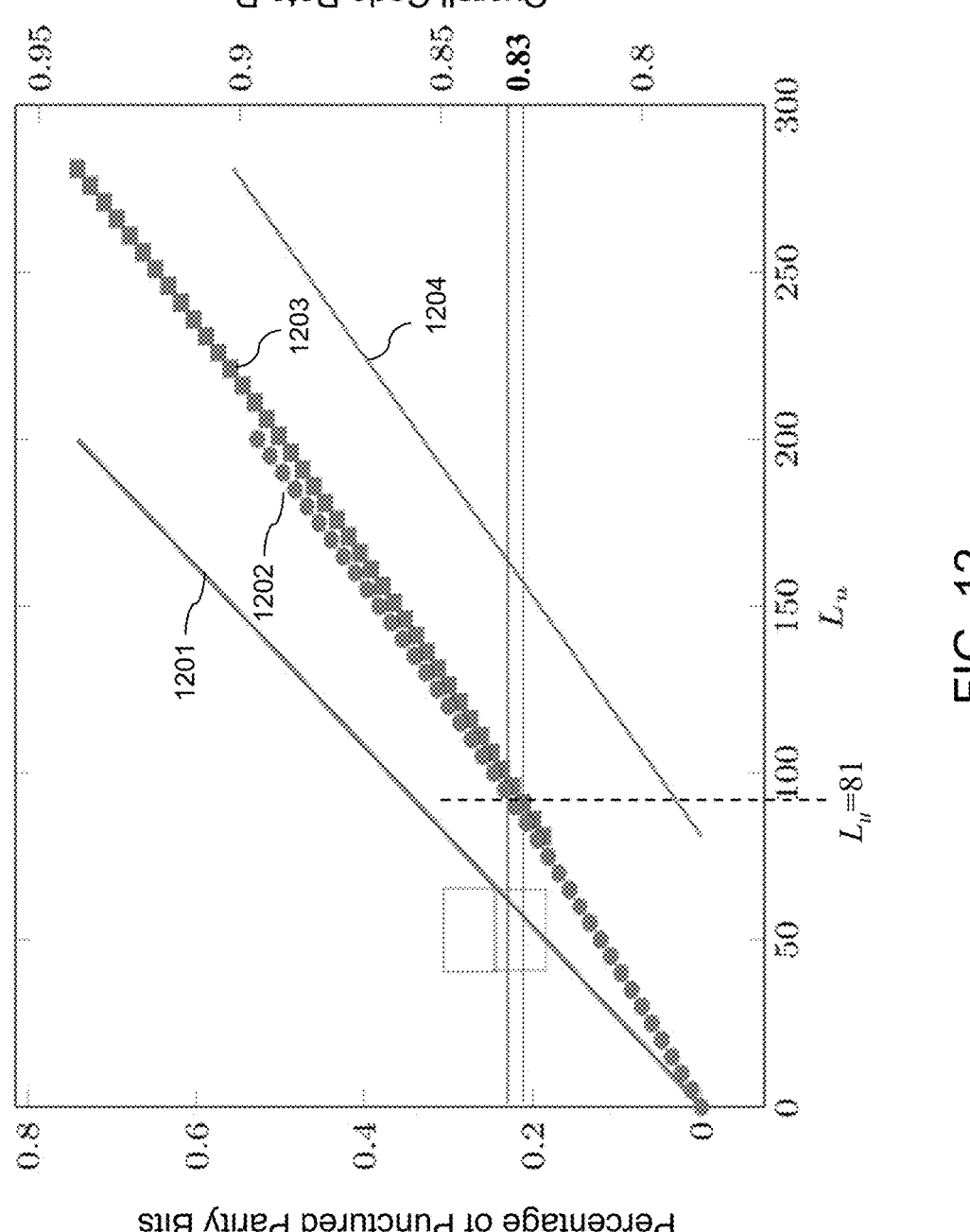
FIG. 12 is a diagram depicting example simulation results using LDPC-coded modulation systems, according to one or more embodiments.

FIG. 12 is a diagram 1200 depicting example simulation results using LDPC-coded modulation systems, according to one or more embodiments. Referring to FIG. 12, lines 1201 and 1204 indicate simulation results (e.g., percentage of punctured bits where $$\frac{L_{punct}}{N \cdot R_c}$$

$L_{punct}$ refers to the number punctured bits, N is the number of information bits which is input to the LDPC encoder 621, $R_c$ is a code rate of the LDPC encoder 621) using $$R_c = \frac{5}{6} \text{ and } R_c = \frac{7}{8},$$

respectively. Lines 1202 and 1203 indicate simulation results (e.g., overall code rate R to achieve target code rate $R_{target}$=5/6≈0.83) using $$R_c = \frac{5}{6} \text{ and } R_c = \frac{7}{8},$$

respectively. The simulation results show that the LDPC code with $$R_c = \frac{5}{6}$$

20 results in significant puncturing loss (see line 1201) while LDPC code with $$R_c = \frac{7}{8}$$

can provide a better tradeoff between the puncturing loss and achieving the target code rate of 5/6 (see lines 1203 and 1204). Based on the simulation results shown in FIG. 12, parameters can be selected such that $$R_c = \frac{7}{8},$$

and $L_u$=81.

Figure 13:
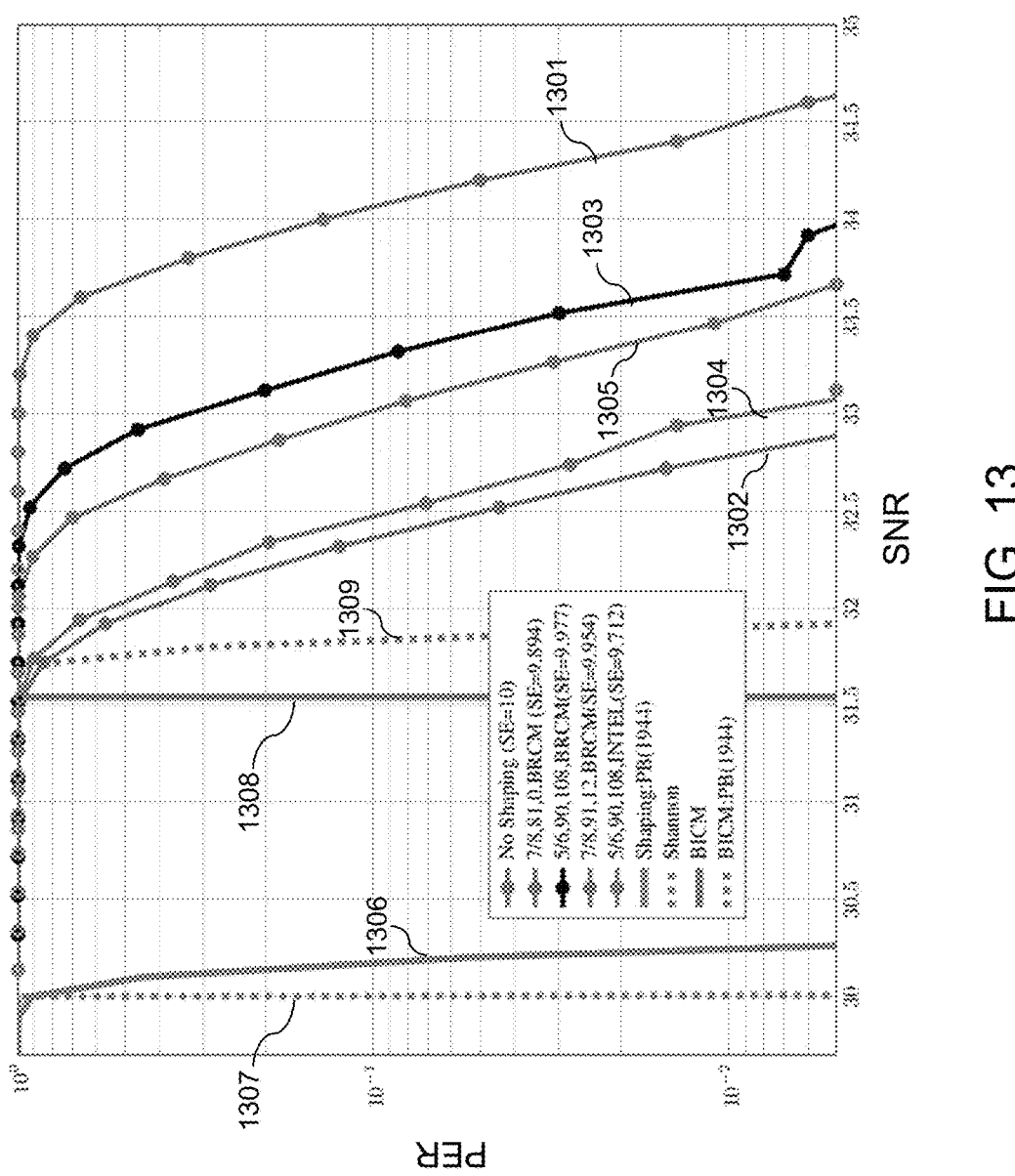
FIG. 13 is a diagram depicting example simulation results using LDPC-coded modulation systems, according to one or more embodiments.

FIG. 13 is a diagram 1300 depicting example simulation results (e.g., packet error rate (PER) over different SNRs) using LDPC-coded modulation systems, according to one or more embodiments. The results were obtained with the following simulation settings: (1) 4096 QAM; (2) 2×2 MIMO additive white Gaussian noise (AWGN) channel; (3) no RF impairments; (4) in all SNRs, shaping rates (referred to as $R_s$ or SE) are adjusted such that 3 dB per 1 bit; and (5) L is 8 KB. Lines 1301, 1302, 1303, 1304, 1305, 1306, 1307, 1308, 1309 refer to the respective simulation results with the settings of (1) no shaping (SE=10); (2) $R_c$=7/8, Lu=81 (SE=9.894); (3) $R_c$=5/6, Lu=90 (SE=9.977); (4) $R_c$=7/8, Lu=91 (SE=9.954); (5) $R_c$=5/6, Lu=90 (SE=9.712); (6) shaping with PB (1944); (7) Shannon limit; (8) BICM; and (9) BICM with PB (1944), respectively. FIG. 13 shows that shaping gain is obtained up to 1.53 dB.

Figure 14:
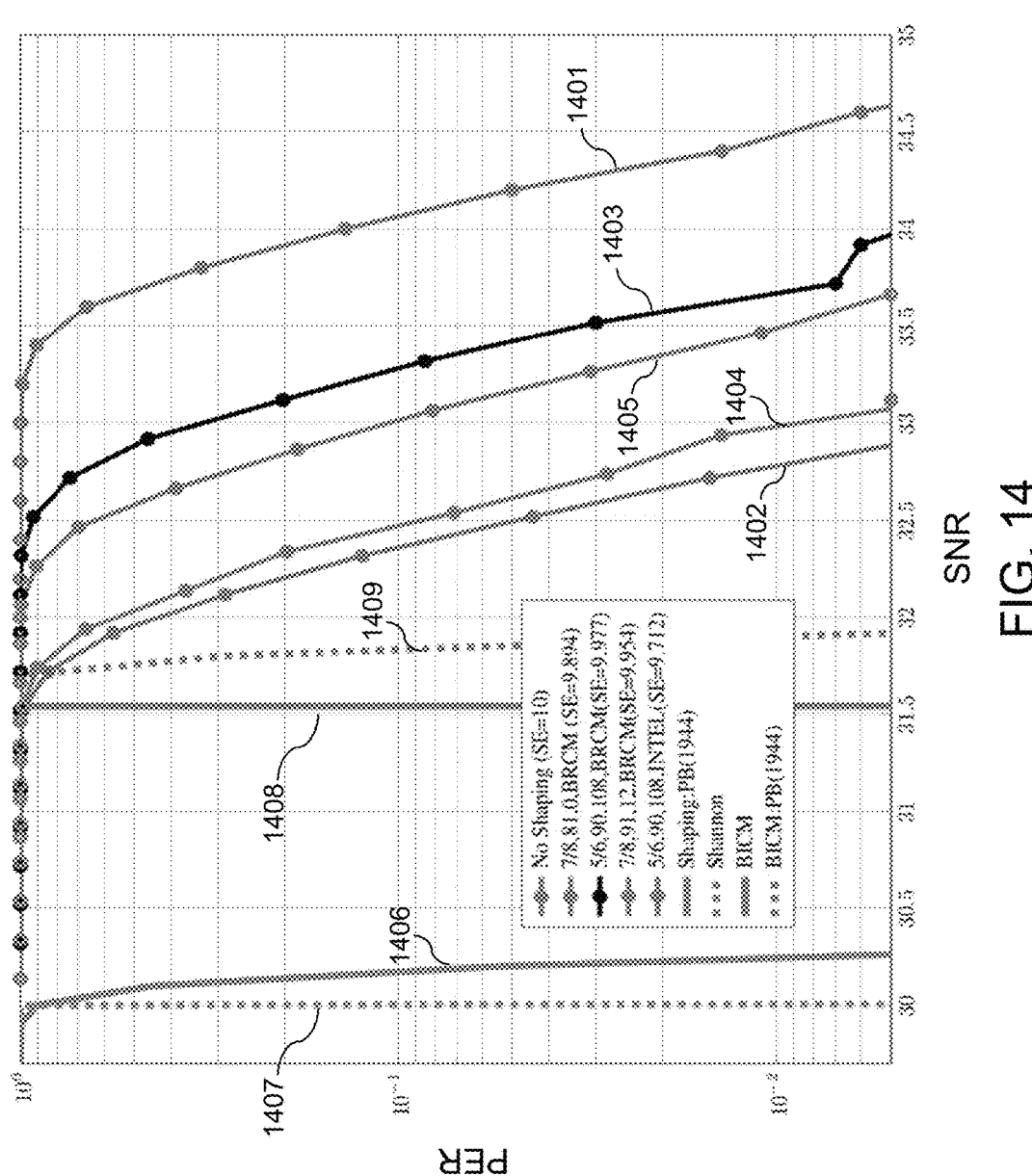
FIG. 14 is a diagram depicting example simulation results using LDPC-coded modulation systems, according to one or more embodiments.

FIG. 14 is a diagram 1400 depicting example simulation results (e.g., packet error rate (PER) over different SNRs) using LDPC-coded modulation systems, according to one or more embodiments. The results were obtained with the following simulation settings: (1) 4096 QAM; (2) 2×2 MIMO AWGN channel; (3) RF impairments exist such that 43 dB noise in transmission (Tx) and 43 dB nose in reception (Rx); and (4) in all SNRs, shaping rates (referred to as $R_s$ or SE) are adjusted. Lines 1401, 1402, 1403, 1404, 1405, 1406, 1407, 1408, 1409 refer to the respective simulation results with the settings of (1) no shaping (SE=10); (2) $R_c$=7/8, Lu=81 (SE=9.894); (3) $R_c$=5/6, Lu=90 (SE=9.977); (4) $R_c$=7/8, Lu=91 (SE=9.954); (5) $R_c$=5/6, Lu=90 (SE=9.712); (6) shaping with PB (1944); (7) Shannon limit; (8) BICM; and (9) BICM with PB (1944), respectively. FIG. 14 shows that shaping gain is obtained up to 1.53 dB.

Figure 15:
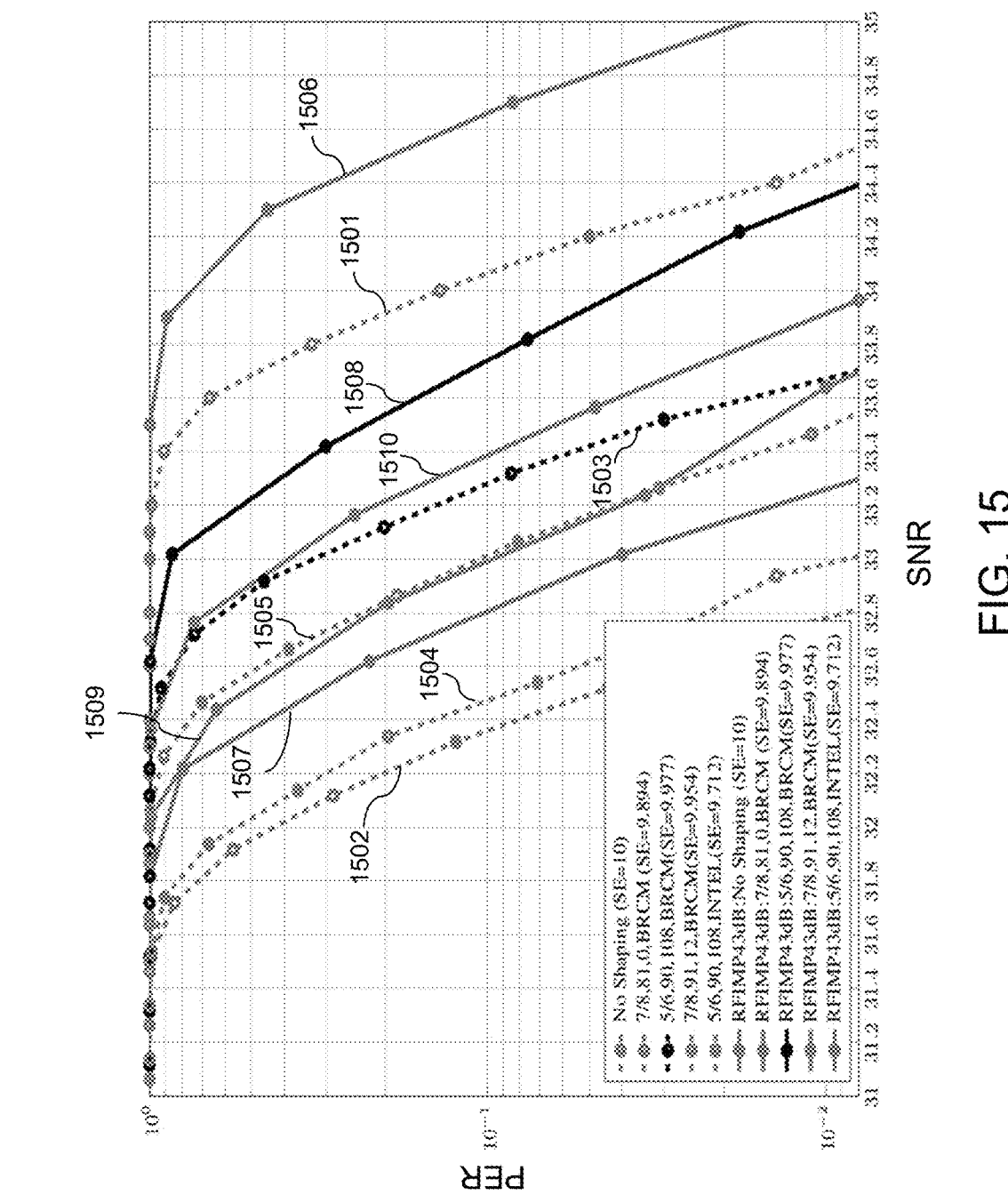
FIG. 15 is a diagram depicting example simulation results using LDPC-coded modulation systems, according to one or more embodiments.

FIG. 15 is a diagram 1500 depicting example simulation results (e.g., packet error rate (PER) over different SNRs) using LDPC-coded modulation systems, according to one or more embodiments. The results were obtained with the following simulation settings: (1) 4096 QAM; (2) 4×2 MIMO transmit beamforming (TxBF) BLOS channel ("BLOS" indicating a 802.11 channel model Type B which is line of sight channel); and (3) in all SNRs, shaping rates (referred to as $R_s$ or SE) are adjusted. Lines 1501, 1502, 1503, 1504, 1505, 1506, 1507, 1508, 1509, 1510 refer to the respective simulation results with the settings of (1) no shaping (SE=10); (2) $R_c$=7/8, Lu=81 (SE=9.894); (3) $R_c$=5/6, Lu=90 (SE=9.977); (4) $R_c$=7/8, Lu=91 (SE=9.954); (5) $R_c$=5/6, Lu=90 (SE=9.712); (6) no shaping (SE=10) with RF impairment with 43 dB; (7) $R_c$=7/8, Lu=81 (SE=9.894) with RF impairment with 43 dB; (8) $R_c$=5/6, Lu=90 (SE=9.977) with RF impairment with 43 dB; (9) $R_c$=7/8, Lu=91

(SE=9.954) with RF impairment with 43 dB; and (10) $R_c$=5/6, Lu=90 (SE=9.712) with RF impairment with 43 dB. FIG. 15 shows that shaping gain is obtained up to 1.53 dB.

Figure 16:
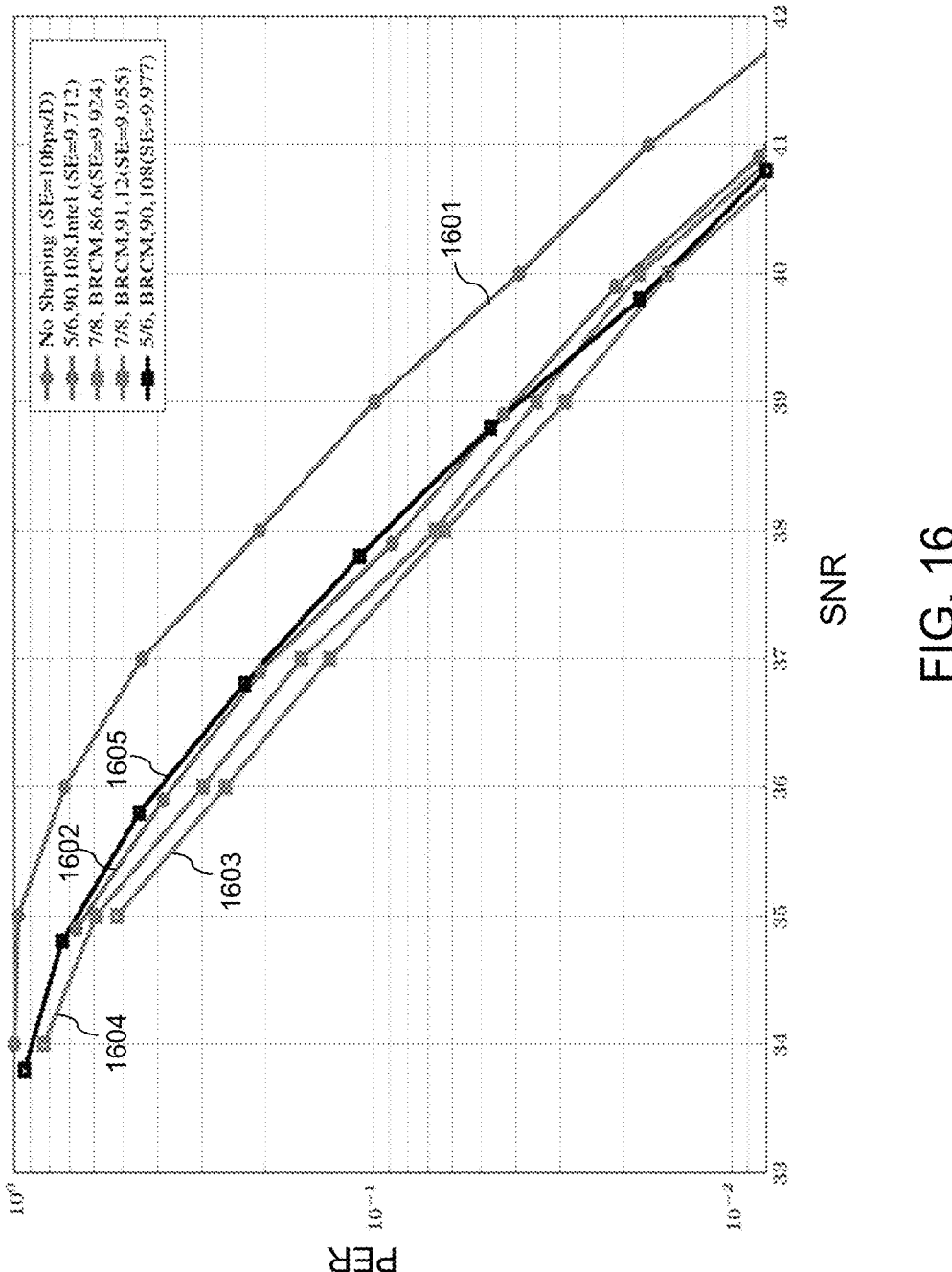
FIG. 16 is a diagram depicting example simulation results using LDPC-coded modulation systems, according to one or more embodiments.

FIG. 16 is a diagram 1600 depicting example simulation results (e.g., packet error rate (PER) over different SNRs) using LDPC-coded modulation systems, according to one or more embodiments. The results were obtained with the following simulation settings: (1) 4096 QAM; (2) 4×2 MIMO transmit beamforming (TxBF) BLOS channel ("BLOS" indicating a 802.11 channel model Type B which is line of sight channel); (3) in all SNRs, shaping rates (referred to as $R_s$ or SE) are adjusted; and (4) there exist RF impairments with 43 dB noise at Tx and 43 dB noise at Rx. Lines 1601, 1602, 1603, 1604, 1605 refer to the respective simulation results with the settings of (1) no shaping (SE=10); (2) $R_c$=5/6, Lu=90 (SE=9.712); (3) $R_c$=7/8, Lu=86 (SE=9.924); (4) $R_c$=7/8, Lu=91 (SE=9.955); and (5) $R_c$=5/6, Lu=90 (SE=9.977), respectively. FIG. 16 shows that a substantial shaping gain is obtained.

Figure 17:
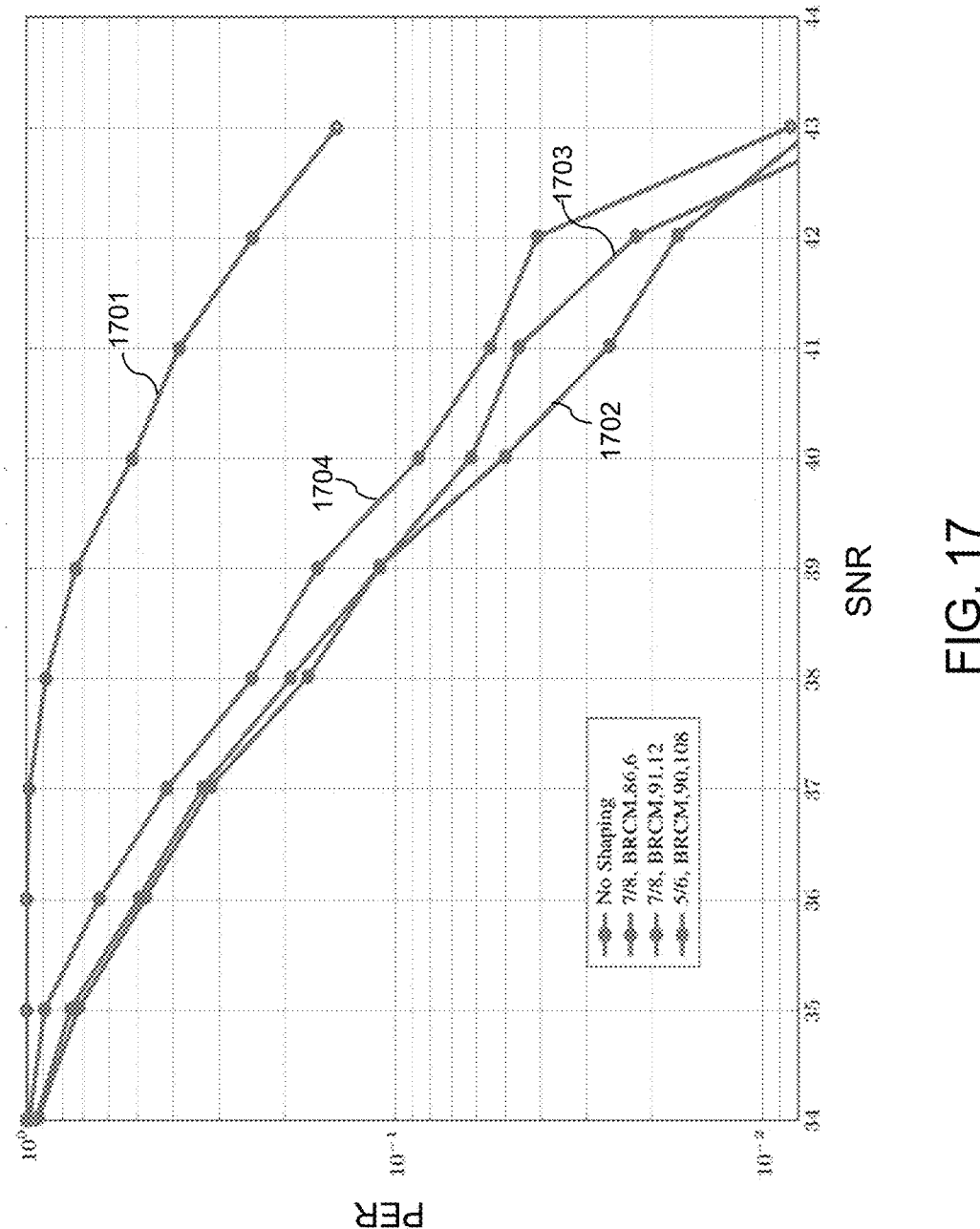
FIG. 17 is a diagram depicting example simulation results using LDPC-coded modulation systems, according to one or more embodiments.

FIG. 17 is a diagram 1700 depicting example simulation results (e.g., packet error rate (PER) over different SNRs) using LDPC-coded modulation systems, according to one or more embodiments. The results were obtained with the following simulation settings: (1) 4096 QAM; (2) 4×2 MIMO BNLOS channel ("BNLOS" indicating a non-line of sight channel) and/or 2×2 AWGN channel; (3) in all SNRs, shaping rates (referred to as $R_s$ or SE) are adjusted; and (4) there exist RF impairments with 40 dB noise at Tx and 40 dB noise at Rx. Lines 1701, 1702, 1703 and 1704 refer to the respective simulation results with the settings of (1) no shaping; (2) $R_c$=7/8, Lu=86; (3) $R_c$=7/8, Lu=91; and (4) $R_c$=5/6, Lu=90, respectively. FIG. 17 shows that (1) to achieve optimum shaping at target code rate of 4/5, $R_c$=5/6, $L_u$=68, $L_p$=4, $P_s$=0.95; and (2) expected effective gain is approximately 0.4 dB.

As shown in FIG. 12 to FIG. 17, shaping gains are meaningful and consistent. For example, shaping gains are up to 1.5 dB in both AWGN and 4×2 TxBF with fading conditions. It is shown that better, substantial shaping gains are achieved with RF impairments. For example, 4×2 TxBF and/or 2×2 fading channels are promising to achieve more shaping gains. The LDPC code rate $R_c$=7/8 shows best performance in terms of achieving the target code rate, while the LDPC code rate $R_c$=5/6 does not achieve the desired spectral efficiency of 10 bps/Hz with 4K-QAM.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A method, comprising:

identifying, by a low-density parity-check (LDPC) encoder of a first device, a target code rate for which to encode data;

receiving, by the LDPC encoder of the first device, a first set of information bits;

receiving, by the LDPC encoder of the first device from an output of a shaping encoder, a second set of information bits;

adjusting, by one or more processors of the first device, a code rate of an LDPC code to a second code rate higher than the target code rate to cause the LDPC encoder to encode the data at the target code rate;

puncturing one or more bits from an output of the LDPC encoder to generate a punctured output of the LDPC encoder;

encoding, by the one or more processors of the first device, the data using the LDPC code and the punctured output of the LDPC encoder; and transmitting, by the one or more processors of the first device, the encoded data.

2. The method of claim 1, further comprising:

adjusting the number of bits in the first set and the number of bits in the second set to encode the data at the target code rate.

3. The method of claim 2, wherein the target rate is 5/6, the second code rate is 7/8, and the number of bits in the first set is 81.

4. The method of claim 1, wherein the first set of information bits are not output from the shaping encoder.

5. The method of claim 1, further comprising:

providing an output of the shaping encoder and the punctured output of the LDPC encoder to a symbol mapper.

6. The method of claim 1, further comprising:

applying, by the shaping encoder, a shaping code to the data wherein the shaping code represents a code for probabilistic constellation shaping.

7. The method of claim 6, wherein the shaping code comprises:

one or more first mappings from a 4-bit string to a 5-bit string with a probability of 1/16;

one or more second mappings from a 5-bit string to a 5-bit string with a probability of 1/32;

one or more third mappings from a 6-bit string to a 5-bit string with a probability of 1/64;

one or more fourth mappings from a 7-bit string to a 5-bit string with a probability of 1/128; and one or more fifth mappings from a 8-bit string to a 5-bit string with a probability of 1/256.

8. The method of claim 7, wherein the one or more first mappings comprise ([0000], [01111]), ([0001], [01110]), ([0010], [01100]), ([0011], [01101]), ([0100], [01001]), ([0101], [01000]), ([0110], [01010]), and ([0111], [01011]), the one or more second mappings comprise ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]), the one or more third mappings comprise ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]), the one or more fourth mappings comprise ([1111110], [11100]), and the one or more fifth mappings comprise ([11111110], [11110]) and ([11111111], [11111]).

9. The method of claim 1, further comprising:

receiving, by a second device from the first device, the encoded data; and receiving, by a low-density parity-check (LDPC) decoder of the second device from the encoded data based on the shaping code, log-likelihood ratio (LLR) values corresponding to the encoded data;

decoding, by the LDPC decoder of the second device, the LLR values using an LDPC code; and applying, by a shaping decoder of the second device, the shaping code to the decoded LLR values to obtain decoded data corresponding to the encoded data.

10. An apparatus comprising:

a transmitter and one or more processors, wherein the one or more processors are configured to:

identify, by a low-density parity-check (LDPC) encoder, a target code rate for which to encode data;

receive, by the LDPC encoder, a first set of information bits;

receive, by the LDPC encoder from an output of a shaping encoder, a second set of information bits;

adjust a code rate of an LDPC code to a second code rate higher than the target code rate to cause the LDPC encoder to encode the data at the target code rate;

puncture one or more bits from an output of the LDPC encoder to generate a punctured output of the LDPC encoder; and encode the data using the LDPC code and the punctured output of the LDPC encoder, and the transmitter is configured to transmit the encoded data.

11. The apparatus of claim 10, wherein the one or more processors are further configured to:

adjust the number of bits in the first set and the number of bits in the second set to encode the data at the target code rate.

12. The apparatus of claim 11, wherein the target rate is 5/6, the second code rate is 7/8, and the number of bits in the first set is 81.

13. The apparatus of claim 10, wherein the first set of information bits are not output from the shaping encoder.

14. The apparatus of claim 10, wherein the one or more processors are further configured to:

provide an output of the shaping encoder and the punctured output of the LDPC encoder to a symbol mapper.

15. The apparatus of claim 10, wherein the one or more processors are further configured to:

apply, by the shaping encoder, a shaping code to the data wherein the shaping code represents a code for probabilistic constellation shaping.

16. The apparatus of claim 15, wherein the shaping code comprises:

one or more first mappings from a 4-bit string to a 5-bit string with a probability of 1/16;

one or more second mappings from a 5-bit string to a 5-bit string with a probability of 1/32;

one or more third mappings from a 6-bit string to a 5-bit string with a probability of 1/64;

one or more fourth mappings from a 7-bit string to a 5-bit string with a probability of 1/128; and one or more fifth mappings from a 8-bit string to a 5-bit string with a probability of 1/256.

17. The apparatus of claim 16, wherein the one or more first mappings comprise ([0000], [01111]), ([0001], [01110]), ([0010], [01100]), ([0011], [01101]), ([0100], [01001]), ([0101], [01000]), ([0110], [01010]), and ([0111], [01011]), the one or more second mappings comprise ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]), the one or more third mappings comprise ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]), the one or more fourth mappings comprise ([1111110], [11100]), and the one or more fifth mappings comprise ([11111110], [11110]) and ([11111111], [11111]).

18. An apparatus comprising:

a receiver configured to receive encoded data, wherein the encoded data is encoded by puncturing one or more bits from an output of a low-density parity-check (LDPC) encoder to generate a punctured output of the LDPC encoder, and encoding data using the LDPC code and the punctured output of the LDPC encoder; and one or more processors configured to:

receive, by an LDPC decoder from the encoded data based on a shaping code, log-likelihood ratio (LLR) values corresponding to the encoded data;

decode, by the LDPC decoder, the LLR values using an LDPC code; and apply, by a shaping decoder, the shaping code to the decoded LLR values to obtain decoded data corresponding to the encoded data.

19. The apparatus of claim 18, wherein the shaping code comprises:

one or more first mappings from a 4-bit string to a 5-bit string with a probability of 1/16;

one or more second mappings from a 5-bit string to a 5-bit string with a probability of 1/32;

one or more third mappings from a 6-bit string to a 5-bit string with a probability of 1/64;

one or more fourth mappings from a 7-bit string to a 5-bit string with a probability of 1/128; and one or more fifth mappings from a 8-bit string to a 5-bit string with a probability of 1/256.

20. The apparatus of claim 19, wherein the one or more first mappings comprise ([0000], [01111]), ([0001], [01110]), ([0010], [01100]), ([0011], [01101]), ([0100], [01001]), ([0101], [01000]), ([0110], [01010]), and ([0111], [01011]), the one or more second mappings comprise ([10000], [00011]), ([10001], [00010]), ([10010], [00000]), ([10011], [00001]), ([10100], [00101]), ([10101], [00100]), ([10110], [00110]), ([10111], [00111]), ([11000], [10111]), and ([11001], [10110]), the one or more third mappings comprise ([110100], [10100]), ([110101], [10101]), ([110110], [10001]), ([110111], [10000]), ([111000], [10010]), ([111001], [10011]), ([111010], [11011]), ([111011], [11010]), ([111100], [11000]), ([111101], [11001]), and ([111110], [11101]), the one or more fourth mappings comprise ([1111110], [11100]), and the one or more fifth mappings comprise ([11111110], [11110]) and ([11111111], [11111]).

* * * * *